US007437158B2

(12) United States Patent
Russell

(10) Patent No.: US 7,437,158 B2
(45) Date of Patent: Oct. 14, 2008

(54) ADVANCED MULTI-NETWORK CLIENT DEVICE FOR WIDEBAND MULTIMEDIA ACCESS TO PRIVATE AND PUBLIC WIRELESS NETWORKS

(75) Inventor: Jesse E. Russell, Piscataway, NJ (US)

(73) Assignee: incNETWORKS Inc., Long Branch, NJ (US)

( * ) Notice: Subject to any disclaimer, the term of this patent is extended or adjusted under 35 U.S.C. 154(b) by 1058 days.

(21) Appl. No.: 10/443,128

(22) Filed: May 20, 2003

(65) Prior Publication Data

US 2004/0249915 A1 Dec. 9, 2004

Related U.S. Application Data

(60) Provisional application No. 60/382,705, filed on May 21, 2002.

(51) Int. Cl.
*H04Q 7/20* (2006.01)
(52) U.S. Cl. .............. 455/435.2; 455/436.2; 455/426.1; 455/552.1
(58) Field of Classification Search .............. 455/435.2, 455/550.1, 425, 439, 426.1, 552.1
See application file for complete search history.

(56) References Cited

U.S. PATENT DOCUMENTS 7,072,657 B2 * 7/2006 Watanabe et al. ........... 455/439
2004/0192309 A1 * 9/2004 Watanabe et al. ........... 455/439
2004/0203998 A1 * 10/2004 Knauerhase et al. ...... 455/550.1
2006/0111084 A1 * 5/2006 Adatrao et al. ........... 455/412.1
2007/0149133 A1 * 6/2007 Lee ......................... 455/67.11
2007/0249316 A1 * 10/2007 Rao ......................... 455/343.1

* cited by examiner

*Primary Examiner*—Joseph Feild
*Assistant Examiner*—S. Smith
(74) *Attorney, Agent, or Firm*—Doster Greene, LLC

(57) ABSTRACT

A wireless device uses position-indicating data to determine its location in relation to multi-layered wireless networks that the device may see concurrently. If location information is available, the device employs a user-defined priority table to select the order of user-contracted available networks. If location information is unavailable, the device employs a technology learning table to automatically adapt CAI protocol options (e.g., GSM, cdma2000, IS-136, IEEE 802.11x, etc.) to search for an available network. Information is gathered and stored in databases within the device to allow automatic adaptation to multiple wireless networks. The device provides unique access to each wireless network with which a user has contracted, without the intervention of any "anchor" network. This allows the device to obtain network service no matter what network it is traveling through and allows the user to traverse multiple wireless networks with seamless access to multiple applications and services provided by those networks.

29 Claims, 13 Drawing Sheets

Position and Protocol Assisted Learning (P²AL) Algorithm Database Structure

Network Detection and Access

INVENTION DEVICE ARCHITECTURE

Position and Protocol Assisted Learning (P²AL) Algorithm Database Structure

| NCM Data File | |
|---|---|
| CN | NCM |
| 1 | boundary points |
| 2 | boundary points |
| 3 | boundary points |
| ... | boundary points |
| k | boundary points |

Figure 2C

| UPP Data File | | |
|---|---|---|
| CN | AP | NP |
| 1 | AP1 | NP1 |
| 2 | AP2 | NP2 |
| 3 | AP3 | NP3 |
| ... | APj | NPj |
| k | APk | NPk |

Figure 2D

| APT Data File | | |
|---|---|---|
| Priority | CN | CAI |
| 1 | CN1 | CAI1 |
| 2 | CN3 | CAI3 |
| 3 | CNj | CAI2 |
| 4 | CNk | ... |
| ... | ... | |
| k | CN2 | CAIx |

Figure 2E

APT: Access Priority Table
UPP: User Personality Profile
NCM: Network Coverage Map
CN: Contracted Network
AP: Access Personality
NP: Network Profile
CAI: Common Air Interface (CAI)

NCM, UPP and APT Databases

Position and Protocol Assisted Learning (P²AL) Algorithm

**Coverage Map Synthesis (CMS)
Algorithm Portion of the P²AL Algorithm**

Capability Update Algorithm

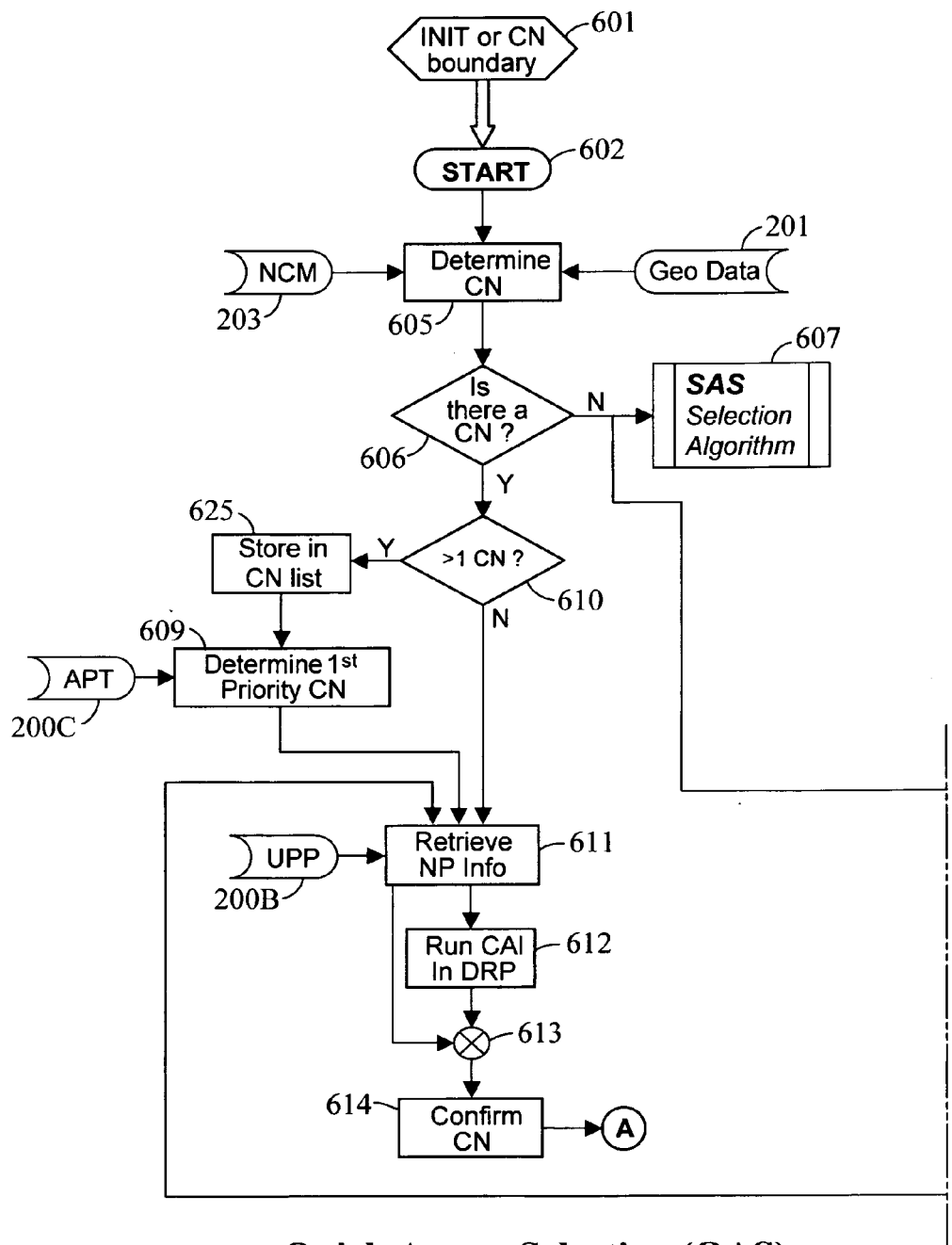
**Quick Access Selection (QAS)
Algorithm Portion of the P²AL Algorithm
Figure 6 (PART 1)**

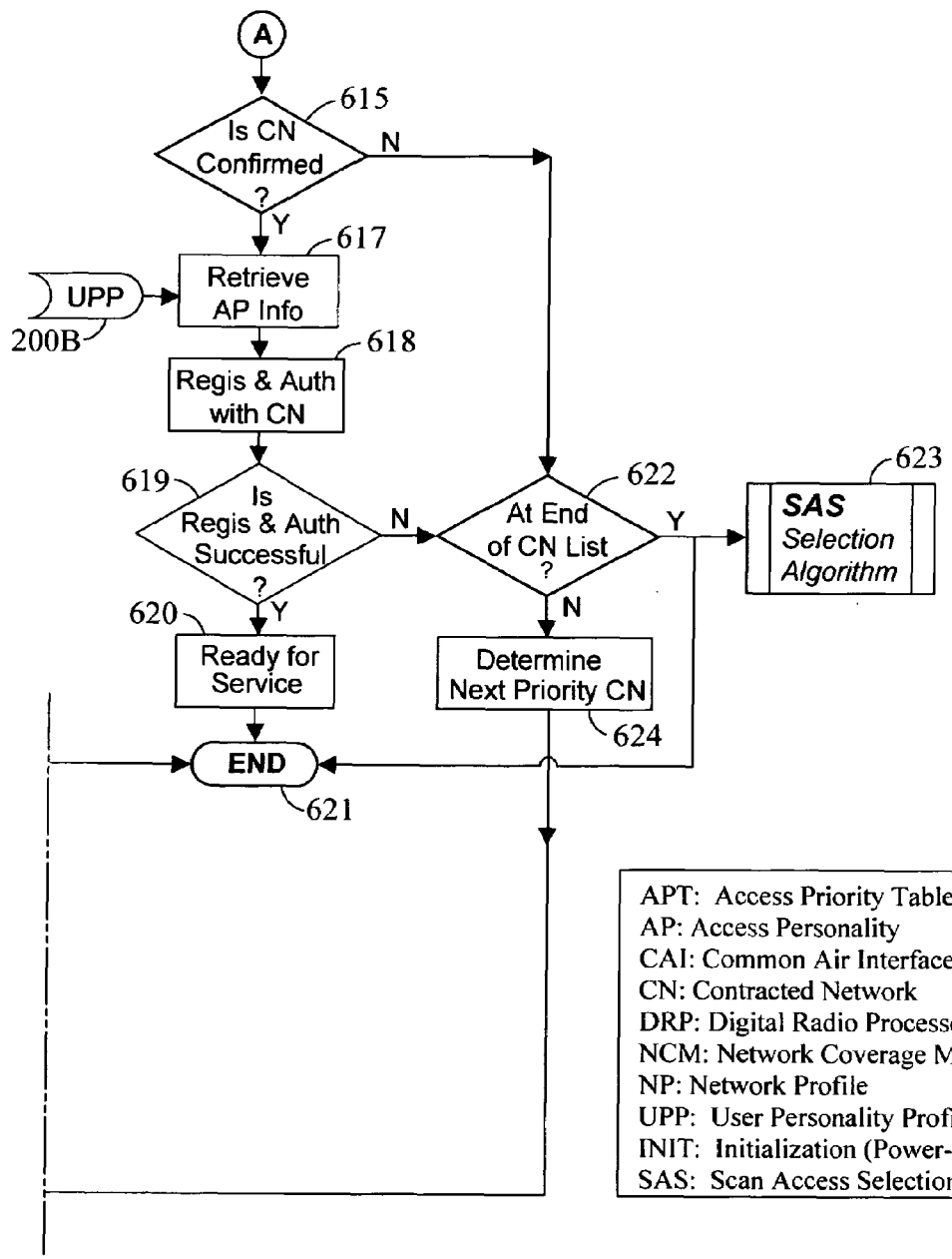
Figure 6 (PART 2)

Scan Access Selection (SAS) Algorithm Portion of the P²AL Algorithm

**CAI Protocol Selection Algorithm Portion
of the P²AL Algorithm**

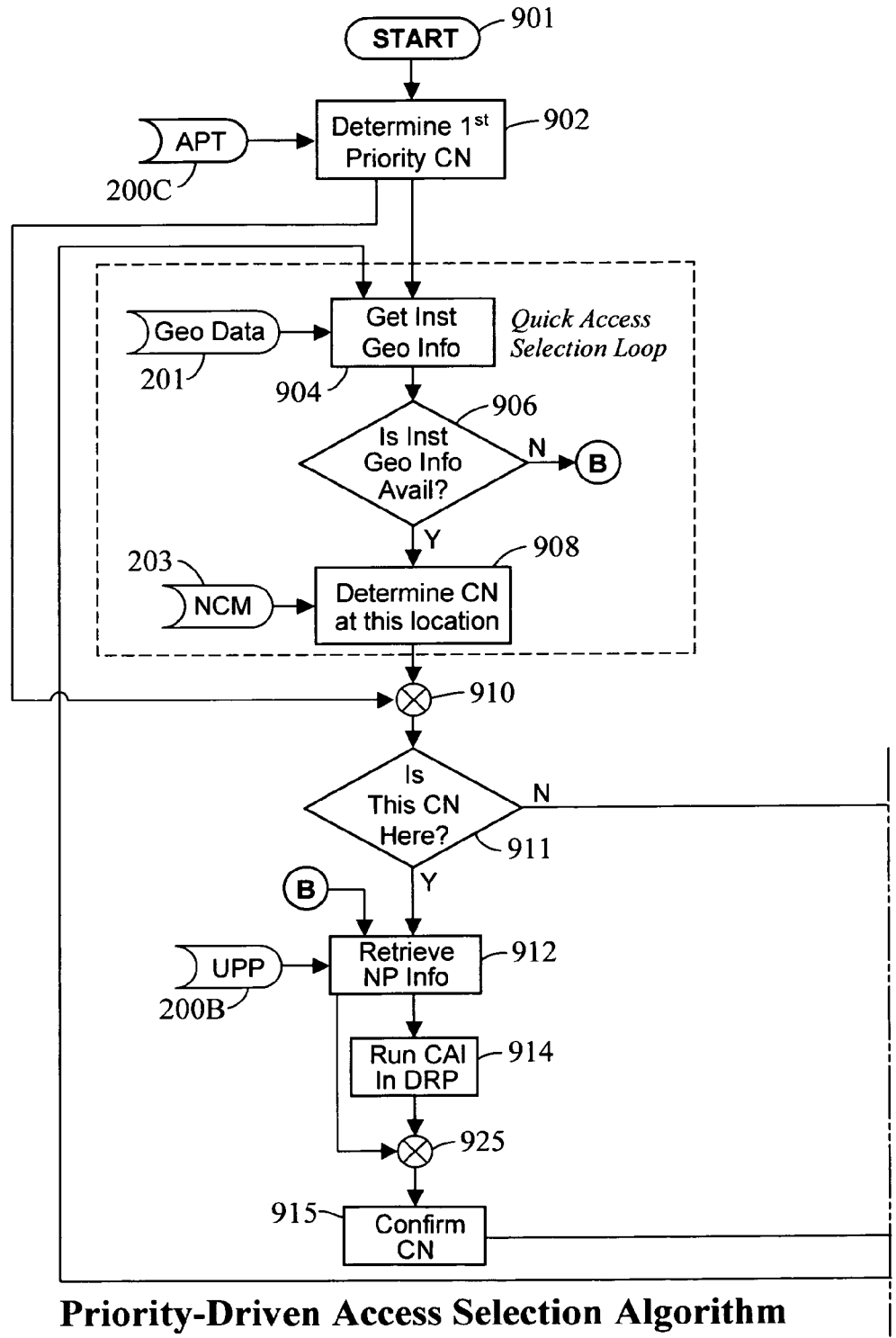
Priority-Driven Access Selection Algorithm
Figure 9 (PART 1)

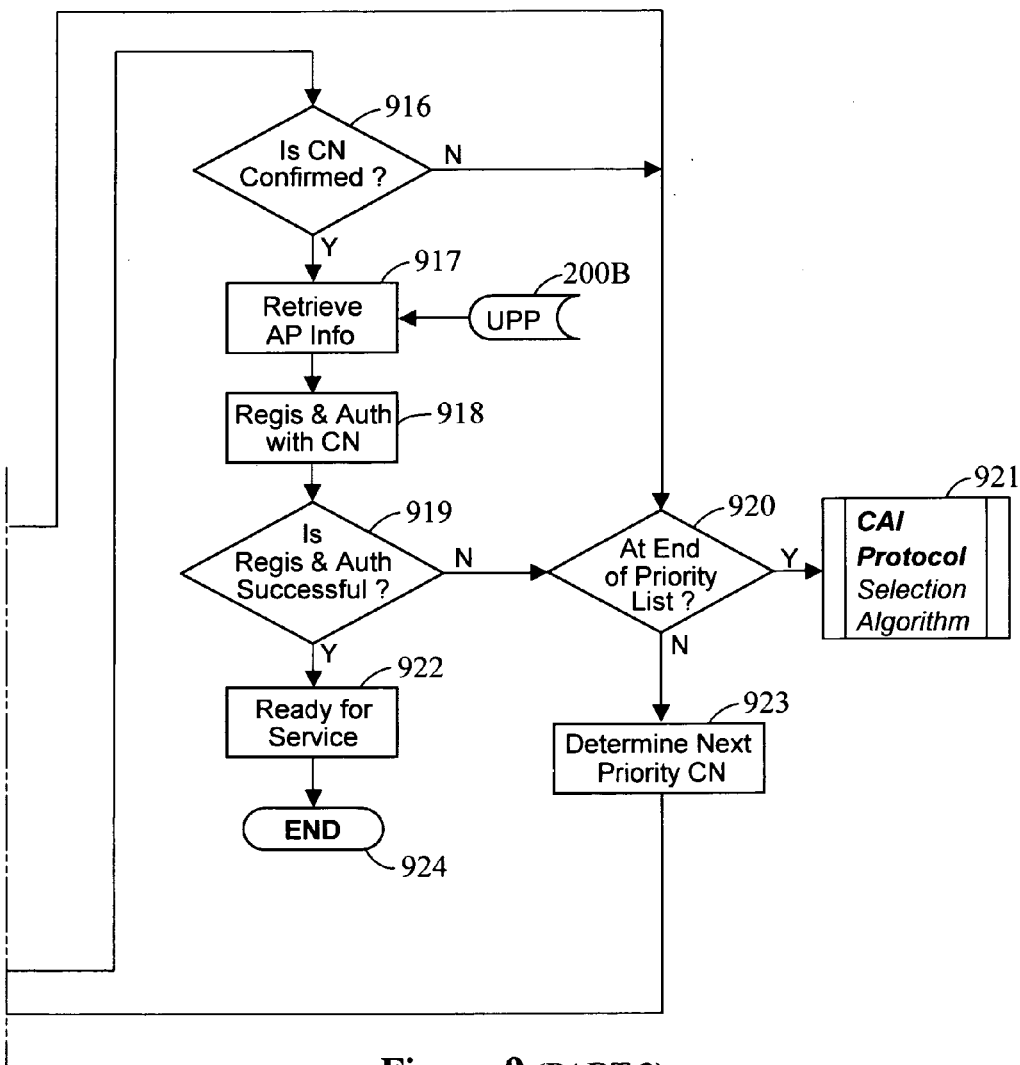
Figure 9 (PART 2)

ADVANCED MULTI-NETWORK CLIENT DEVICE FOR WIDEBAND MULTIMEDIA ACCESS TO PRIVATE AND PUBLIC WIRELESS NETWORKS

RELATED APPLICATIONS

This application is related to and claims the benefit of U.S. provisional patent application Ser. No. 60/382,705, filed May 21, 2002 and entitled An Advanced Multi-Network Client Device For Wideband Multimedia Access To Private And Public Wireless Network. The contents of this provisional application is incorporated herein by reference.

FIELD OF THE INVENTION

This invention relates to a unique end user device for a voice, data and multimedia networking solution, providing a wide-range of communications functions and multi-registration capabilities in a single device and a method of implementing same.

BACKGROUND OF THE INVENTION

I:

The convergence of telecommunications, multimedia and wireless technologies creates the demand for robust, modular, and wideband devices which serve the needs of users (especially business users) for extended (ubiquitous) wireless access across several geographic "campuses", ease of access to any wireless network, consistent look and feel across networks, and broadband access to new services. As more wireless devices access the Internet than PCs, users will demand more functionality and capability from those devices.

An End User Device, "EUD" (e.g. Mobile Station (MS) or Handset) provides user access to any wireless (e.g. cellular or wireless LANs) communications network. This takes the form of voice, data/internet access, and multimedia. Access to the wireless network's full features and services is limited by the capabilities of this end user device. As today's systems become more complex and integrated, the EUD is a critical component to unlocking network functionality and providing seamless, streamlined, and effortless access to emerging wireless services.

Current networks often require new devices for each technology in disparate wireless (e.g. cellular) networks. Recent implementations of EUDs have given way to re-configurable devices which change their profiles through the use of programmable radios and multiband antennas. A Software Defined Radio (SDR) is specified in the industry as a radio providing multiple modulation techniques and frequency ranges in narrow or wide-band operation under software control. The radios can adapt to multiple networks and are "configurable" (software configurable) to one Common Air Interface (CAI) protocol at a time. Historically, this approach has been used for military applications and was expensive on a per-subscriber basis. Power constraints in the handset (end user device) often limited the technology to Base Station (BS) or Access Point (AP) applications. Recent technology advances have made this a viable approach for today's wireless devices.

SDRs generally integrate the "inner" and "outer" communications functions into a single chipset which forms so-called "single-chip radios" or "single-chip devices". These devices function from a single point of program control. The "outer" communications functions drive the signal processing to the antenna and the "inner" communications functions drive the signal processing inward toward the baseband processing.

GSM (Global System for Mobile Communications) networks provide a fundamental ability to define personalities for their devices through the use of SIM (Subscriber Identity Module) cards. The technology of SIM cards provides a central location in the GSM end user device (e.g. mobile station) for defining its personality. User specific and personalized parameters are created, updated and stored in individual SIM cards, allowing the end user device to operate in any GSM network regardless of geographic location. The SIM card authenticates the end user device to the cellular (wireless) network by providing user-specific parameters that uniquely identify the device (and the user) in its environment. Changing SIM cards allows the user to don a new identity in the network. While traveling between networks, particularly in Europe where GSM is the predominant network, users are not required to carry multiple phones and register in multiple networks. Instead, they carry multiple SIM cards to augment their device's personality in different environments.

The registration of an end user device in multiple networks requires an understanding of the mobility management techniques used in today's wireless communications networks. The essential components of mobility management are user authentication and location update (registration) of the end user device (e.g. mobile station). These concepts are rooted in the establishment of a "home" area defined by the customer's wireless service provider. Once subscribed, the entries in the wireless service provider's database establish the home network for the user. The mobility management systems utilize locational databases which hold the necessary information to authenticate, register and locate any device subscribed to the network as well as to control the provisioning of services subscribed to by the user.

As the user passes through a network to which they are not subscribed, a temporary database is created in the visiting network. The temporary user subscription information stored in the visiting network contains the same end user device information and service information, which is a subset of the information stored in the home network, together with temporary location information which includes its current position. This visiting network database enables the end user device to function within the new networks, with temporary subscription information to route and connect access for the user. Because each foray into a new network will require a stable point in time to reference, a single device usually references back to a single home location. These techniques are only relevant between networks with compatible technologies (for example CDMA or TDMA) and CAI protocols (e.g. GSM, IS-136, IEEE 802.11x).

In current networks, roaming agreements are created as a convenience for customers traveling between geographic areas. Such agreements permit the customer to use their device within a visiting network on a temporary basis and allow access to that network without operator intervention. The Home Network tells the Visiting Network what services the customer is entitled to and the Visiting Network bills the Home Network for those services (later passed on to the subscriber). In current networks, if there is no agreement with the visiting network, the user has to go through an operator to establish a temporary billing arrangement before a call is permitted.

II:

Most of today's reference architectures are of content delivery networks to accommodate wireless devices, such as (wired) broadband networks being enhanced to include wireless extensions for voice and data access. Much of the new innovation has taken the form of providing this support through enhancements to existing technologies.

However, since wireless communications now play a very major role in fulfilling daily communications needs, they should no longer be treated as just extensions of existing wired networks. As wireless communications services are available in many networks with different characteristics (e.g. radio technologies, operating spectrum, bandwidths, signaling protocols, network controls, user controls, etc.), there arises the need to make the access to these different wireless networks as simple and easy as possible for the user. The advances thus far in internetworking for the most part have been applied to large scale wireless networks and are not accessible to in-building, campus-wide or enterprise-wide communications applications. When it is applied to small networks, it is in the form of Wireless LANS, and data only applications.

For example, multimode Radio Cards such as Nokia's recently announced type II/III PC Card indicate support for GPRS (Global Packet Radio System), HSCSD (High Speed Circuit Switched Data) and 802.11b Wi-Fi compliant systems in one device. These devices promise "always on" high data rate services utilizing the packet-based (GPRS) and circuit-based (HSCSD) flavors of GSM and the Wi-Fi Wireless LAN systems. But multimode Radio Cards address the needs of roaming in data-only environments without addressing voice services. The system is also limited to GSM-related and line-of-sight wireless LAN networks. Users outside of these types of systems would have no access. There is a need to extend this roaming freedom to voice access as well as technologies other than GSM.

As another example, dual subscription services such as those enabled by SchlumbergerSema's smart cards allow two different accounts to co-exist on the same SIM card. These accounts are for GSM networks and are operated singly within the user device (phone). Dual SIM Card technology such as SIM Card Pro is an unusual solution which connects two SIM cards to one user device. The two SIM cards are connected in the user device to a virtual SIM by a cable. The two cards cannot be used simultaneously, and the user device must be reset to switch between the two.

However, manipulation of SIM card technology, also limited to GSM networks, still requires multiple cards for each phone to cover multiple networks. Dual subscription services (limited to GSM), require call forwarding between accounts to have access to both networks. While multiple SIM cards provide access to multiple networks across geographical boundaries, each change of a SIM requires a different telephone number to access the same device. The overall network that is accessible by multiple SIM cards then becomes a patchwork of networks, with clearly defined seams and boundaries, limited by the personality programmed into each card. There is a need for a device which can span multiple networks while maintaining a singular identity.

As yet another example, dual or multi-NAM devices currently available support registering a user device with a different local number in each market. The Number Assignment Module (NAM) is an EEPROM (Electrically Erasable Programmable Read Only Memory) which stores the subscriber specific parameters including the International Mobile Station Identification (IMSI) and the MIN (but not the ESN). This approach is also known as Dual Line Registration, Dual System Registration, or Dual Telephone Number. It maps two wireless numbers into a single user device allowing services from two wireless networks without incurring roaming charges in either network.

However, dual or Multi-NAM devices require multiple telephone numbers to access the networks to which they are known. A way is needed to be able to recognize the user as a home user regardless of which network they are accessing. This would allow the user to maintain a consistent look and feel across multiple networks.

Preferred Roaming Lists (PRLs) common in current networks to affect multiple registrations, are roaming agreements set up with contracted service providers in different geographical regions. A PRL is a list of five-digit System Identification Numbers (SIDs) which are unique for the service area of the provider and include network types such as Residential, Private or Public serving areas. Upon communicating with any wireless network, the Mobile Switching Center (MSC) provides its SID to the device for identification. The SID is used to distinguish between different networks (for example, "home" and "visitor"). When using a PRL, it is first checked for these other providers when the device is not in its home network. PRLs facilitate communication in foreign networks without requiring operator intervention as in the case of credit card payment.

PRLs exist within a single technology or network, and are not shared between different types of technology (such as between CDMA and TDMA). There is a need for a device that will permit the roaming between different contracted networks regardless of technology.

Other approaches, such as Global Roaming services, Protocol Gateways and Interworking Gateways, facilitate multi-network access by network enhancements which are more expensive as well as technology and network-centric.

Global Roaming services are focused on GSM. Protocol Gateways are designed to provide architectural enhancements to home network databases. Interworking Gateways are targeted at providing flexibility and scaling to very large network configurations. These approaches do not support the scalability, flexibility and accessibility required for enhanced devices.

The struggle to design End User Devices that are uncomplicated yet powerful tools for network access has resulted in specialized devices providing the most power for the least complexity in specific networks. Voice access has led in this development as the most popular technology in use. Data access is being developed as adjunct cards to computing devices such as PCs and handhelds. Video technology has not progressed as quickly in this arena. Convergence in the form of "smart" devices which support voice with limited data, has not adequately served the business market in need of maintaining a wireless experience comparable to the wired experience as a wireless device moves through different environments of rooms, buildings, states, or countries. There is a great need for a single device that retains a familiar look and feel for its user when it moves through various environments.

IP (Internet Protocol) devices require a specific port with associated IP address which provides a customized user experience. That experience cannot be duplicated at another port, even if network access exists. The user has limited capability in that environment. In a wireless solution, the user can connect to its home network through a wireless portal which does not require an associated address and have familiar and consistent access to its databases and systems.

Present-day SDR technology which facilitates the roaming across multiple network technologies does not expand to allow the user to function within those different networks as a home user. Instead, users are provided with limited access and extended billing. The frequent travelers of a multi-national corporation need universal access to their networked data and telephony services with the power to change and adapt these services in real-time.

Wireless devices (e.g. telephones) are currently designed with internal codes which only function on one network. In order to gain access to another network, connection to the previous network must be terminated and then re-established in a new network. Service constructs such as Personal 800 numbers address this issue in the wired network arena by creating a single number which locates the user wherever they may be (i.e. residential, business, mobile). However, the wireless requirement of a home area makes such a choice impossible in wireless networks currently. Wireless Number Portability has not been achieved in current networks because numbers are mapped back for routing and billing to the home network. When a user changes "homes", the number stays with the home network and not the device. SIM cards facilitate movement between global GSM networks but also require different access (phone) numbers for each network. A new type of end user device is needed which can function without an "anchor" (home) network while providing that equivalent access across multiple networks.

It is an object of the present invention to address the deficiencies of the prior art.

SUMMARY OF THE INVENTION

A multi-protocol, multi-network device in accordance with the present invention provides a platform for data, voice and multimedia applications in a single unit. Broadband High Speed Internet Access may also be available through the device.

The invention device employs Software Defined Radio (SDR) techniques to convert from one Common Air Interface (CAI) protocol (e.g. GSM, cdma2000, IS-136, IEEE 802.11x, etc) to another under software control. With SDR capability, the invention device is able to work with any network, not just GSM but also CDMA, TDMA, 802.11x and any other wideband wireless technologies or CAI protocols. It is future-proofed, i.e. the device will not become obsolete when innovations in 3G technology, 4G and beyond are implemented.

The practical application of SDR in this invention device creates the capability of dynamically asserting the proper personality from multiple identities for accessing a particular network without user intervention. The invention device is agile and robust enough to be used to access wide-area wireless networks as well as in-building, campus and enterprise wireless networks.

The device's application of SDR supports dynamic real-time CAI protocol technology adaptation. The invention therefore supports the access of ad hoc networks by downloading CAI protocol parameters directly into the invention device over the radio link. For example, when encountering a network which operates on an updated version of the CAI protocol used by the inventive device, the device can use its existing CAI protocol to request the updated protocol from the network. The device can then download, and integrate the new protocol into its transmissions. The same procedure can be utilized when encountering a network operating on an unknown protocol. The device can use its existing CAI protocol to request the new protocol from the network. The protocol can then be utilized by the device. In this manner, the device's flexibility to communicate with various networks is maximized. At the same time, the device is future-proofed against being rendered obsolete by the natural evolution of CAI protocols.

The selection of a network based on position data is generally preferred and will be used if position data is available. GPS (Global Positioning System) information is collected by the invention device to provide real-time geographic location information to streamline the process for identifying its location with respect to available wireless networks. Boundary data for geographic coverage area maps associated with contracted networks, as the invention device defined coverage area, are stored within the invention device and updated as new data becomes available. Associated Network Profiles for each wireless network are also stored within the invention device.

In one embodiment, the invention uses a Position and Protocol Assisted Learning ($P^2AL$) algorithm to collect configuration data to gather information about its environment. This data, whether it is "position"- or "protocol"-based, "assists" the device in "learning" about its environment for access. Position based collection involves comparing the physical location of the inventive device with the physical boundaries of known networks. Protocol based collection involves the use of CAI protocols to actively query the spectrum using various protocols until a network capable of use responds. The information the device learns is then utilized to configure the parameters used by the invention device to access the services available to it.

In another embodiment of the present invention, an automatic transaction system enables the purchase of communication services from a network based on the personal account of the user.

BRIEF DESCRIPTION OF THE DRAWINGS

In the drawings, wherein like reference numerals denote similar elements throughout the several views:

FIG. 2C depicts the database structure of a Network Coverage Map (NCM) data file in accordance with the embodiment of FIG. 2B;

FIG. 2D depicts the database structure of a User Personality Profile (UPP) data file;

FIG. 2E depicts the database structure of a Access Priority Table (APT) data file.

FIG. 6 is a flow chart of the quick access selection (QAS) algorithm portion of the $P^2AL$ algorithm;

FIG. 9 is a flow chart of the priority-driven access selection algorithm.

DETAILED DESCRIPTION OF THE PREFERRED EMBODIMENT

Figure 1:
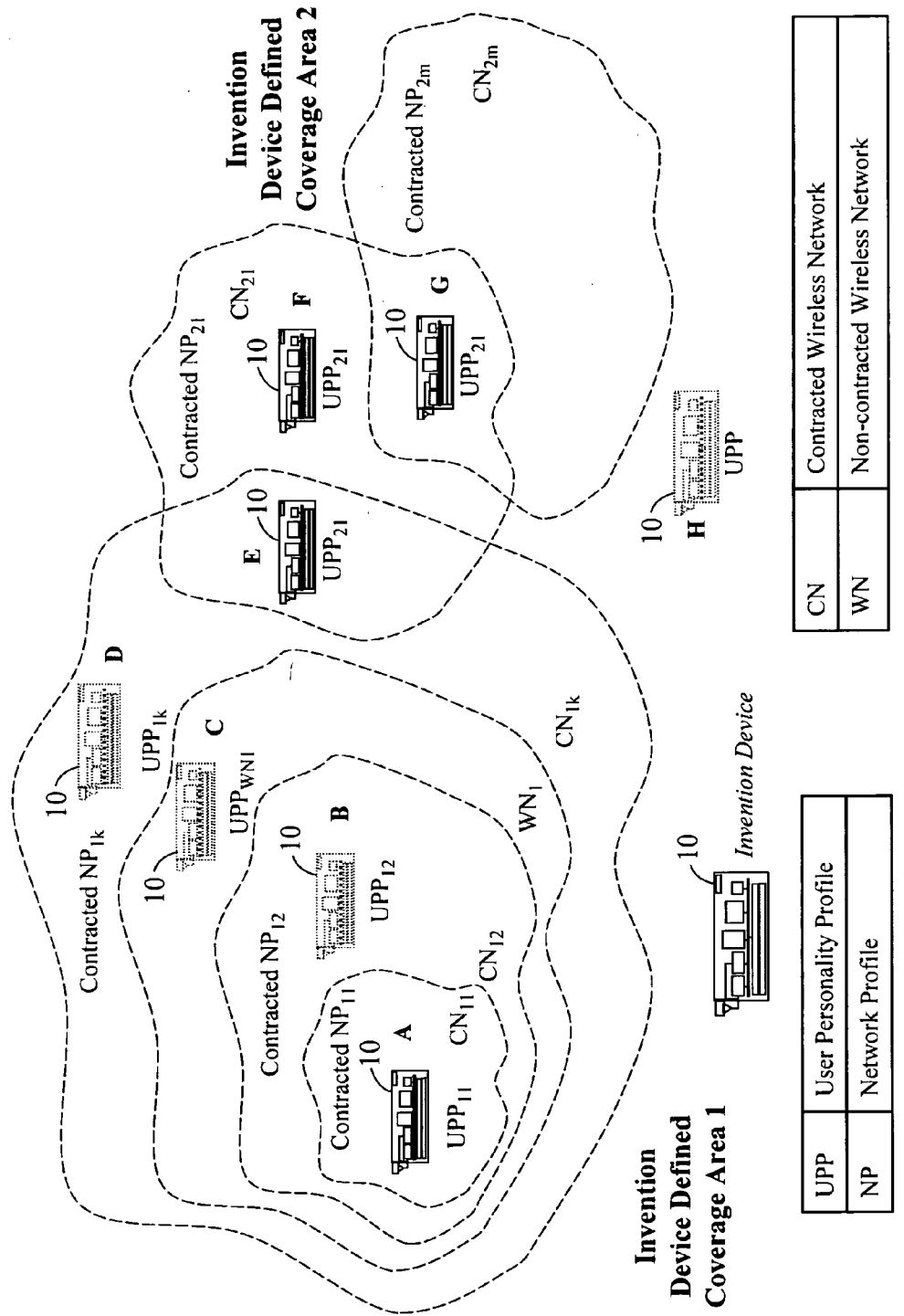
FIG. 1 depicts an example of an environment in which an inventive device may be used.

Referring to FIG. 1, a wireless device 10 in accordance with the invention provides a platform for data, voice and multimedia applications in a single unit which can operate seamlessly across multiple networks that operate with different wireless protocols. Device 10 may take various forms. For example, it may be a computer that has a wireless connection, an advanced type of wireless telephone, etc. Device 10 is provided with SDR capability to enable it to work with any network, not just GSM but also CDMA, TDMA, 802.11x and any other wideband wireless technologies or CAI protocols. Broadband High Speed Internet Access is also available through the device.

The inventive device 10 can communicate with multiple wireless networks as shown in FIG. 1. In the example of FIG. 1, there are a series of overlapping wireless networks, $CN_{11}$, $CN_{12}$, $WN_1$ and $CN_{1k}$, where CN refers to a "Contracted Network". A user of the wireless device 10 contracts with one or more of the "contracted networks" to be able to obtain wireless service within that contracted network on pre-determined or negotiated contractual terms. The wireless network $WN_1$ is a network with which the user has not yet entered into a contract (a non-contracted network). As an example, the outermost layered network $CN_{1k}$ might be a wireless network that spans a state. $WN_1$ might be a local wireless service with only city coverage. A particular block may support wireless internet access to contracted network $CN_{12}$. Finally, a building on the block may have its own wireless network $CN_{11}$. Each of the wireless networks $CN_{11}$, $CN_{12}$, $WN_1$ and $CN_{1k}$ may use a different wireless technology, such as GSM, CDMA, TDMA, 802.11x and any other wideband wireless technologies or CAI protocols.

There may also be additional networks such as $CN_{21}$ and $CN_{2m}$, where $CN_{21}$ is, for example, a network that partially overlaps the coverage area of $CN_{1k}$, and $CN_{2m}$ does not overlap with any of $CN_{11}$, $CN_{12}$, $WN_1$, or $CN_{1k}$.

As a result of user movement, the inventive device 10 moves and can be located at different positions such as positions A, B, C, D, E, F, G and H. When a user is at position A, device 10 has four different networks to which it has access. When a user with device 10 is at position B, device 10 has only three different networks to which it has access, etc. When a user is at position E, networks $CN_{1k}$ and $CN_{21}$ are available. When a user is at position H, no wireless networks are available. As explained below, the device 10 is capable of knowing where it is located and what wireless networks are available for it to access. Device 10 can automatically adapt itself to utilize a personality and technology suitable for communicating with a selected one of the wireless networks.

This invention defines the architecture and design of device 10 that greatly expands the capability of current wireless devices to support multiple networks with the ease and advantage of a "home" device appearance. Device 10 is used as a "home" device to access multiple registered networks.

Figure 2A:
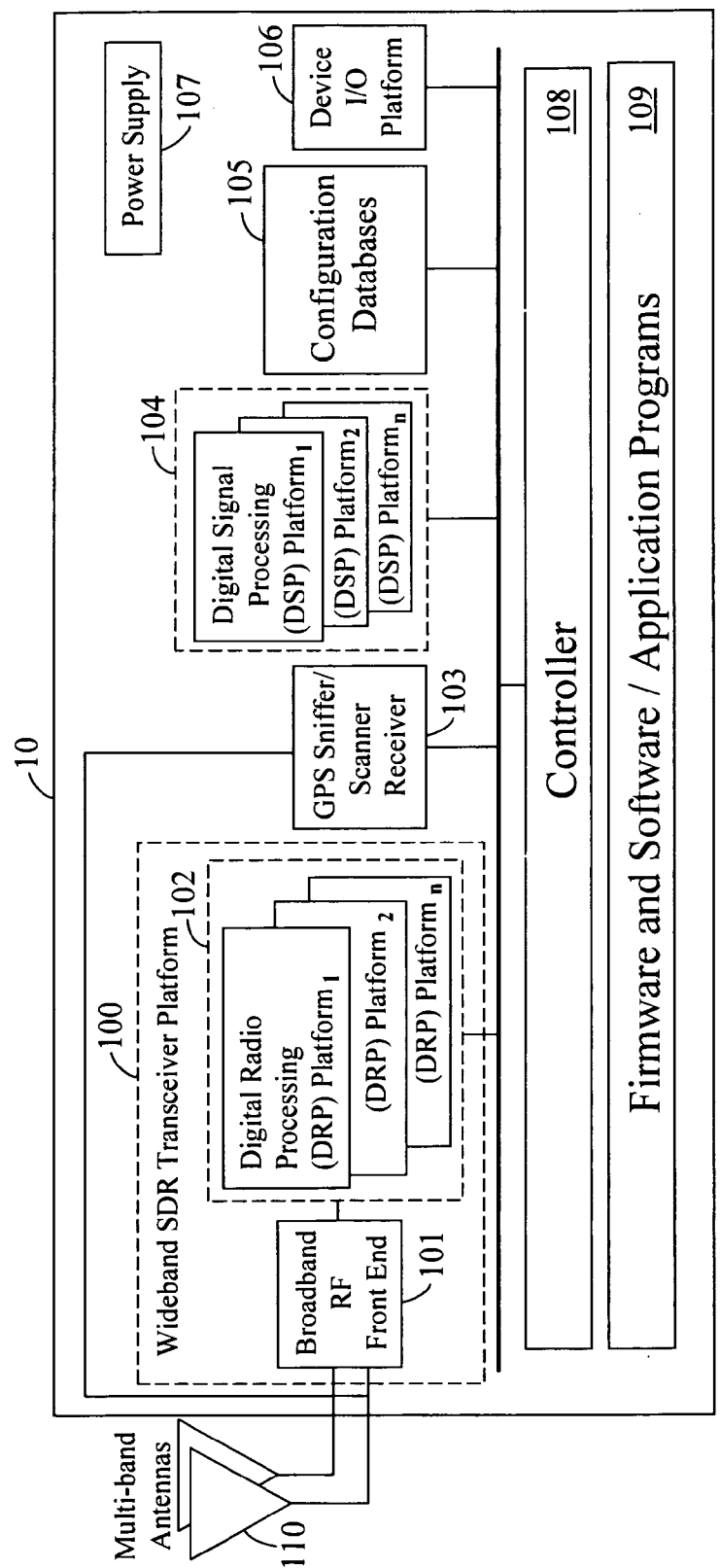
FIG. 2A depicts the architecture of the inventive device in accordance with an embodiment of the invention.

FIG. 2A depicts the architecture that device 10 uses in an embodiment of the invention.

Device 10 comprises a Wideband SDR (Software Defined Radio) Transceiver Platform 100, a GPS Sniffer/Scanner Receiver 103, Digital Signal Processing (DSP) Platforms 104, configuration databases 105, device I/O 106, power supply 107, a controller 108 for controlling device 10 based on the application firmware and software, firmware/software programs 109 for running device 10, and one or more Multi-band antennas 110.

The Wideband SDR Transceiver Platform 100 comprises a Broadband RF Front End Radio 101 and Digital Radio Processing (DRP) Platforms 102. The Broadband RF Front End radio 101 is a spurious-free high dynamic range broadband radio. This broadband radio 101 allows the invention device to see the full spectrum available to it by scanning the band in segments.

Device 10 partitions the integrated functions in current SDR designs onto multiple ICs for the flexibility of dynamically changing radio personalities in real time. In this partitioned design, the DRP Platforms 102 comprise specialized ASICs (Application Specific Integrated Circuits) that are used for performing common functions within the device 10 such as software radio processing, including channel shaping, tuning, and filtering in a digital domain with up/down conversion and control software. By understanding which functionalities must be performed by all transmission platforms, and by incorporating these generic functions into specialized ASICs a highly flexible structure is realized. These special-purpose ASICs (or "ASIC engines") provide the hard-coded logic used to configure the Digital Radio Processing (DRP) Platforms. General-purpose ASICs such as DSPs (Digital Signal Processors) 104 are used to perform the programmable tasks. The DSP contains the control software that is used to call and control the functions implemented in the specialized ASICs. Programs downloaded or stored in the DSP configure the device 10 according to specific applications, allowing it to conform to the target network. This approach provides maximum flexibility, programmability and re-configurability.

The digital radio processing function provides the programmable capability to switch the invention device from one radio technology to another. Changes in the network selected by device 10 for communication cause a personality adjustment in the device that dynamically alters the technology (i.e. CDMA, TDMA, etc.) and CAI protocol (i.e. GSM, IS-136, cdma2000, IEEE 802.11x etc.) that are needed to communicate with the selected network. The wideband front end radio and the antenna change thus frequencies accordingly. These changes are made by dynamically transferring new parameters into the DRP Platforms 102, thereby enabling device 10 to be usable for multiple networks and technologies.

The GPS Sniffer/Scanner Receiver 103 receives real-time geographic position information from GPS satellites. This portion of the invention device remains active even when the device 10 is turned off. Device 10 routinely scans for geographic positioning and stores the results in its configuration database. The GPS Receiver 103 provides a time-stamped position-based identification of the location of device 10, taking advantage of GPS receiver technology. The GPS scanner/receiver includes a "sniffer" function which continuously scans for the presence of GPS location data to determine the position of device 10 within a network. As further described below, the results of these scans are time-stamped and stored in the invention device location database (Network Coverage Map) for later retrieval.

The DSP (Digital Signal Processor) Platform 104 comprises a set of DSPs and associated processing, including baseband processing and channel signal processing. The baseband processing provides modem and codec functions. The DSP Platform 104 stores the firmware and algorithms ("personality" profiles) that are used to facilitate communication between the invention device and the network. The digital signal processing function provides the necessary processing of signals for the associated radio technology and CAI protocols, including the baseband processing which provides the baseband features and input/output signal conversions, such as modem, speech codec, video compression, etc. To access a contracted network, the appropriate network "personality" profile is transferred to the DRP (digital radio processing) Platform 102 which changes device 10's CAI protocol identity.

The user I/O devices 106 (such as display, keypads, speaker, etc.), power supply, controller 108, and the multiband antenna 110 are standard products. For example, I/O devices 106 and power supply 107 are commercially available from Analog Devices, controller 108 is commercially available from ARM Ltd., and antennas 110 are available from Galtronics. At least some of these components are alternatively available from ArrayCom.

Figure 2B:
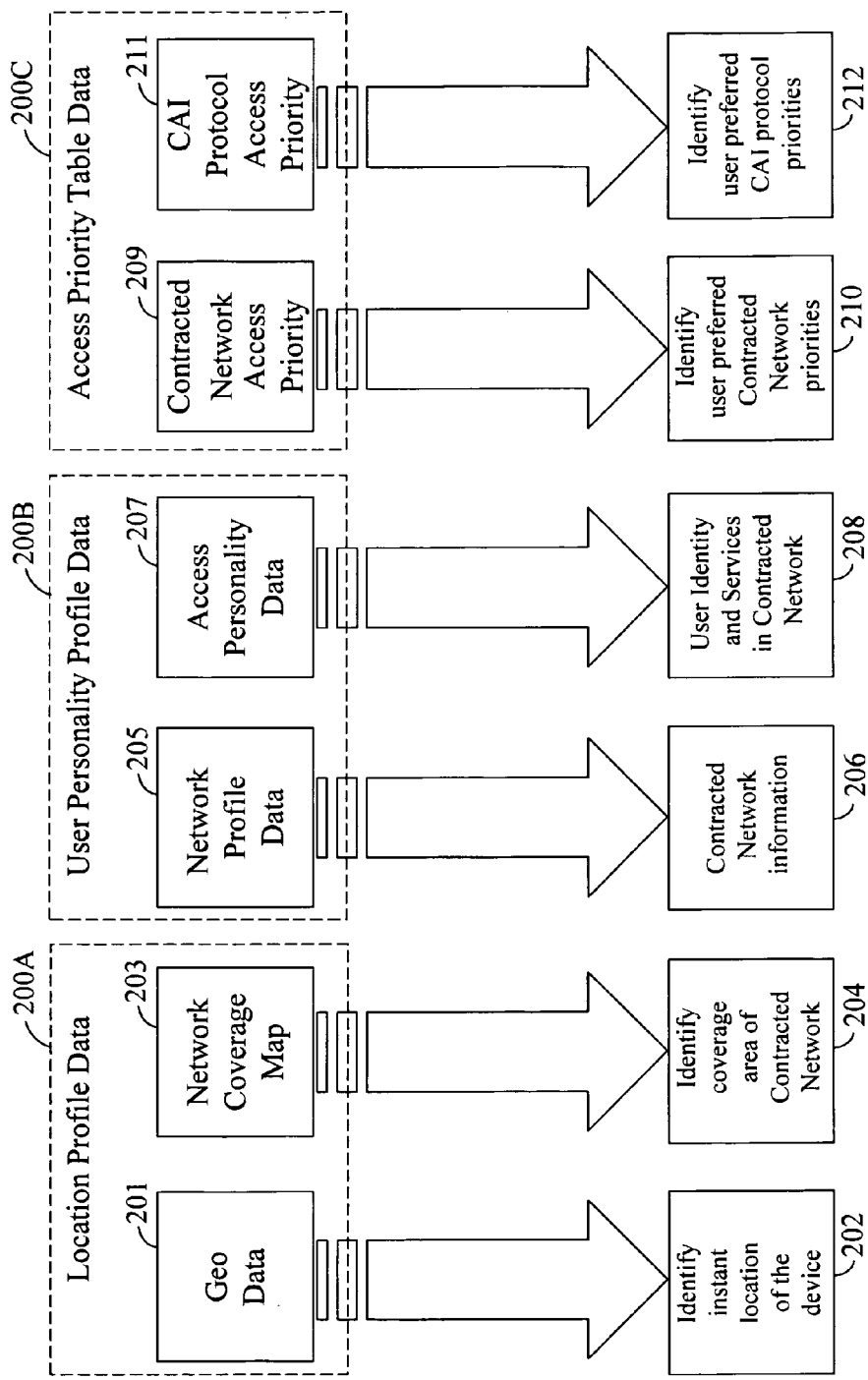
FIG. 2B depicts a data structure in accordance with one embodiment of the invention for storing data on the inventive device of FIG. 2A, the data being used in conjunction with a Position and Protocol Assisted Learning ($P^2AL$) algorithm.

FIG. 2B illustrates a high-level view of an embodiment of the database structure used in conjunction with a Position and Protocol Assisted Learning ($P^2AL$) algorithm. The $P^2AL$ algorithm is loaded as an application in memory in device 10 and is used by device 10 to select a wireless network with which to communicate when device 10 is located at a particular location. These configuration databases 105 are described in three segments: Location Profile data 200A, User Personality Profile (UPP) data 200B, and Access Priority Table (APT) data 200C. For the purpose of this application, the words table and profile are used interchangeably. The form or structure in which the data is contained is irrelevant to the present invention. One of ordinary skill in the art would understand that many different organizations and structures of data could be utilized to achieve the functional objectives of the present invention. Each of these segments consists of two components. In the Location Profile segment 200A there is GPS data 201 (also described as "GEO"—short for geographical—in later flowcharts) and Network Coverage Map (NCM) data 203. In the UPP segment 200B, there is Network Profile data (NP) 205 and Access Personality (AP) data 207. And in the APT segment 200C there is contracted network Access Priority data 209 and CAI (Common Air Interface) Protocol Access Priority data 211. Configuration databases 105 may also include data for the CAI protocol and other databases which provide a means to configure the software of device 10 to adapt to any network in which it may find itself. Databases 105 may contain network profiles for multiple networks to enable device 10 to configure itself to communicate with any of these networks. These databases contain data that are either gathered by the device 10 or permanently stored in the device 10 to facilitate these changes.

The GPS data 201 comprises geographic position data stored in the device 10 that is used to help pinpoint the location of device 10 within its current environment and with relation to the contracted networks for which it has coverage 202, as the invention device defined coverage area. The Network Coverage Map data 203 represents coverage area map boundary data that is stored in the device 10 for each contracted network. The NCM data may be created at device 10 or downloaded. When device 10 is used, this boundary data is used as a starting point for building out more detailed maps by using the collected GPS data to synthesize (create) yet more data points. These additional points of GPS data are then incorporated into the coverage maps 204.

In using the invention device with current networks, network-specific identifiers (Network Profile, NP) and user-specific access information (Access Personality, AP) are created and stored within the invention device as the User Personality Profile 200B.

The User Personality Profile database is able to store as many "personality" profiles as desired. The limitation to the number of profiles is the complexity of the hardware required in storing large amounts of data. The UPP 200B also supports several levels of VPN security access including basic over-the-air (OTA) security, so-called "tunneling" point to point VPN and point to multi-point VPN access, mission-critical dynamic keying scheme, and any other pre-determined levels. The OTA is basic encryption over the air interface. Tunneling provides a direct access to either another device in the system (point to point) or a group of devices (point to multi-point). The mission-critical levels provide a dynamic keying scheme with selectable keys for enhanced security access. The security levels are user-selected at initialization and dynamically adjustable at any time. The invention device stores as many UPPs as desired, one for each contracted network.

The Network Profile data 205 represent specific network profile information for each contracted network. A Network Profile captures the contracted network uniquely, including CAI protocol, SID, device identifiers, etc. Thus, this data provides the parameters of a contracted network for the invention device to create the corresponding personality/identity (e.g. CAI protocol, SID, device identification, etc.) to allow it to communicate with that particular contracted network 106. For each contracted network, there is a network profile signal processing image stored in the DSP Platform as a load module. These signal processing "programs" are prioritized under user control, creating preferred modes for the invention device. To select a contracted network, the appropriate firmware load module is transferred to the DRP. The image is used to configure the broadband RF front end radio aspect of the transceiver function.

The Access Personality data 207 contains the specific user identity and user services associated with device 10 and its user for each contracted network. Thus, data 207 provides previously stored user identification information (e.g. Personal Identification Number, PIN) and the preferences and service contracts associated with the user to activate the invention device for service access within a particular contracted wireless network 208.

An Access Personality represents the user uniquely in each of the contracted networks. As the user enters a new network and tries to establish communication, the priority with which it communicates to its contracted networks is consulted, and the geographic position data is compared against the stored Network Coverage Map data to determine which contracted network the invention device may access. Without that match, the invention device runs through a scanning algorithm assuming the device personality for each contracted network in order of priority and attempting communication. If a match is found with one of the contracted networks, then the corresponding AP is sent to the network, and normal authentication ensues.

If no match is found, the real-time transaction-based service access method is invoked. Using the invention device in an enhanced wireless network architecture provides the flexibility of creating a Temporary Network Profile to map the Current NP to the invention device's Network Profile list. This Temporary NP is used by the invention device to communicate with the enhanced network to determine what temporary identifiers (e.g. User Personality Profile, Access Priority Table, and Network Profile) should be created for the non-contracted network. The temporary assigning of these identifiers is a transaction service which allows the user to have a common experience on this foreign network.

The contracted network Access Priority data 209 stores a user-defined access priority table for accessing the contracted networks in order of user-defined priority 210. The Common Air Interface Protocol Access Priority Data 211 is likewise a user-defined priority table that sets the priority for device 10 to select one of the available CAI protocols. Device 10 uses the CAI protocol parameters to scan the environment by communicating with the network and determine whether a contracted wireless network is present within its location. Object load modules (i.e. CAI protocol images) representing each supported Common Air Interface protocol are stored in a CAI protocol database. Additional load modules are downloadable to the invention device to adjust for future enhancements in CAI protocol technology.

Thus, six components, organized under three segments or files, come together to form the complete database for the P²AL algorithm.

As discussed above, FIGS. 2C, 2D, 2E show a logical structure of the respective separate NCM, UPP and APT databases of FIG. 2B. The Network Coverage Map database consists of contracted networks with boundary point information on the coverage area maps. The User Personality Profile database consists of Access Personality data for each stored contracted network which holds specific user identification and service requirements on each contracted network, and Network Profile data for each stored contracted network which allows the invention device to configure itself to communicate with the contracted network. The Access Priority Table database consists of contracted network access priority information for position assisted learning and Common Air Interface protocol access priority information for protocol assisted learning.

Figure 3:
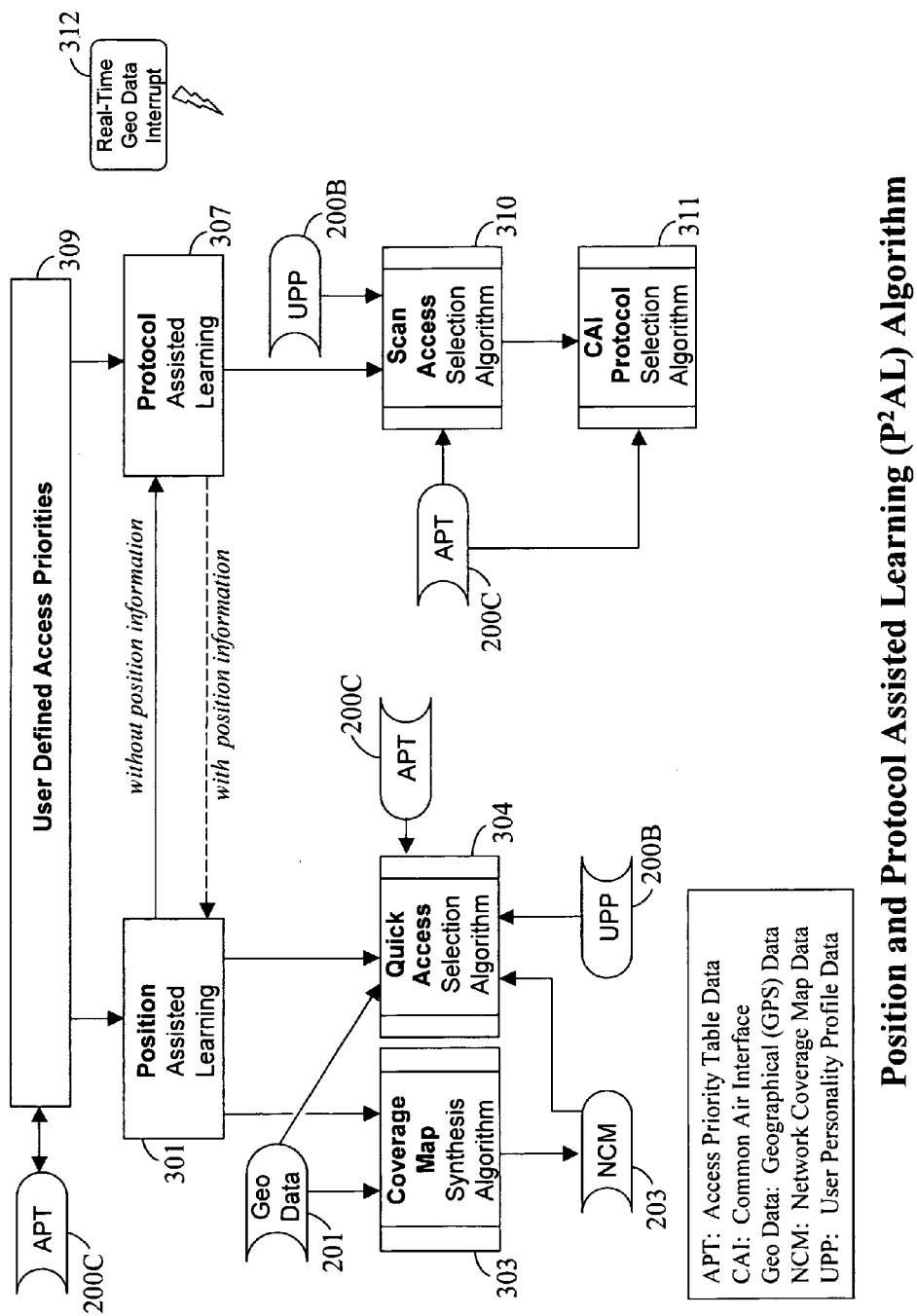
FIG. 3 is a flow chart depicting an overview of the $P^2AL$ algorithm and its interaction with the data structure of FIG. 2B.

FIG. 3 shows a flow chart for the Position and Protocol Assisted Learning (P²AL) algorithm with its sub-algorithms. The P²AL algorithm comprises multiple sub-algorithms including a Position Assisted Learning algorithm 301 and a Protocol Assisted Learning algorithm 307. The former comprises a Coverage Map Synthesis algorithm 303 and a Quick Access Selection algorithm 304, while the latter comprises a Scan Access Selection algorithm 310 and a CAI Protocol Selection algorithm 311. (In addition, device 10 also has a Capability Update Algorithm (see FIG. 5) to enhance its capabilities via physical contacts (e.g., a wired connection) or over the air download in real time, originated either by the invention device (user) or by the network.)

The P²AL algorithm assumes that a user has established one or more contracted networks. Upon initialization, device 10 calls up its list of contracted networks and displays them to the user at step 309. The user is able to select (or rank) the priority order in which contracted networks are to be accessed. For example, if there are contracted networks 1, 2 and 3, the user may specify that CN2 should be selected before CN1 and CN3 for whatever reason, such as perhaps CN2 has a better pricing structure or better service. The rank order of priority which is selected is then stored in the Access Priority Table 200C. If the rank order is pre-specified at an earlier time, step 309 may be skipped. Next, device 10 uses the information in the APT 200C and proceeds to the Position Assisted Learning algorithm 301 where the GPS database 201 is accessed for current data on the device's geographic position. When both geographical and access priority information are available at device 10, device 10 identifies the available contracted network at its location to access using Location Profile data 200A and transfers the appropriate parameters from the User Profile Personality data 200B in database 105 to the SDR Transceiver Platform 102 and Digital Signal Processing Platforms 104 to attempt service access to that network.

If current GPS geographic information is available, the P²AL algorithm proceeds to step 303 where the CMS algorithm compares real-time GPS data received by device 10 with its currently stored boundary information Network Coverage Map for the contracted network in which it is currently activated to determine if there is a match. If there is no match (i.e., device 10 does not have boundary information for the selected network), the algorithm updates the NCM 203 with the new coordinates, providing a more accurate view of the device's coverage areas. The CMS algorithm 303 runs continuously, using real-world data to create wireless network coverage maps with increased accuracy and completeness.

The Position Assisted Learning algorithm also comprises a QAS algorithm 304. The QAS algorithm 304 analyzes the real-time GPS data 201 and uses it to identify available contracted networks at its location. It uses the Access Priority Table 200C to determine which one to select first if there is more than one. For each available contracted network, from the User Personality Profile 200B, it retrieves the necessary user information from the Access Personality profile data 207 to configure the invention device and retrieves network information from the Network Profile 205 to try to communicate with available contracted networks.

If geographical information is unavailable, device 10 uses a Protocol Assisted Learning algorithm 307 which utilizes an iterative loop described below to determine the available network, if any, at its location through a process of elimination. The Protocol Assisted Learning algorithm 301 would thus be invoked if there is no GPS data available at device 10 (for example, certain building interiors or other areas in which signal data cannot be received).

The Protocol Assisted Learning algorithm first calls on a Scan Access Selection algorithm 310. Algorithm 310 uses an iterative process of adopting the personality of each contracted network of which it has a record in memory and attempts to communicate with the selected network. The SAS Algorithm uses the Access Priority Table 200C to define the order in which it scans for available contracted networks. It uses the User Personality Profile 200B to get the Network Profile information 205 necessary to dynamically configure device 10 to attempt access with the selected contracted network. Receipt of a real-time GPS data interrupt stops processing of the SAS algorithm 310 and sends the device 10 back to its Quick Access Selection (QAS) algorithm 304. The SAS algorithm 310 invokes the CAI Protocol Selection algorithm 308 if it exhausts its APT and does not find any contracted network. Like the SAS algorithm, the CAI Protocol Selection algorithm 311 uses an iterative process with CAI Protocol Access Priority information from the APT 200C to look for available networks by implementing CAI protocols to scan in sequence.

The following sections provide more detailed descriptions of the sub-algorithm components of the P²AL algorithm and its complementary Capability Update Algorithm.

Figure 4:
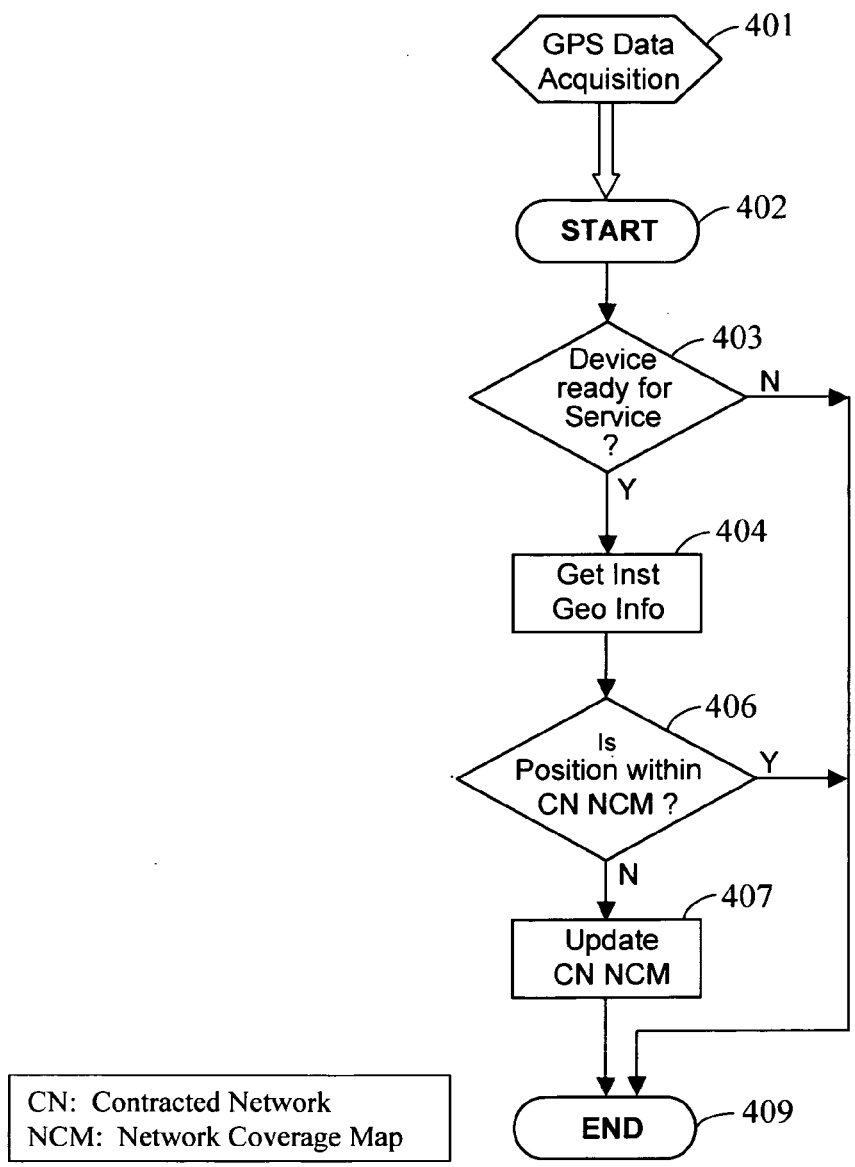
FIG. 4 is a flow chart of the coverage map synthesis algorithm portion of the $P^2AL$ algorithm.

FIG. 4 shows a detailed flow chart for the Coverage Map Synthesis (CMS) algorithm 303. This algorithm is an ongoing process as GPS data is dynamically gathered by the invention device 10. Through this algorithm, the device can update its memory to include networks discovered by its searches. Before the CMS algorithm begins, at step 401, GPS data is acquired. The algorithm starts at step 402. At step 403, the algorithm determines whether device 10 is service ready (that is, whether it has registered with and been authorized by a network and is ready to make and receive calls). If it is service ready, at step 404 device 10 accesses time-stamped information from the GPS receiver. As that information is stored in the Geo database 201, it is compared at step 406 with the existing Network Coverage Map database 203 for the current contracted network. If it is not within the boundary of the NCM 203, the NCM is updated at step 407 to reflect the additional information. If the geographic data indicates that device 20 is within the NCM is already accurate and complete, no update is needed and the CMS algorithm ends at step 409.

Figure 5:
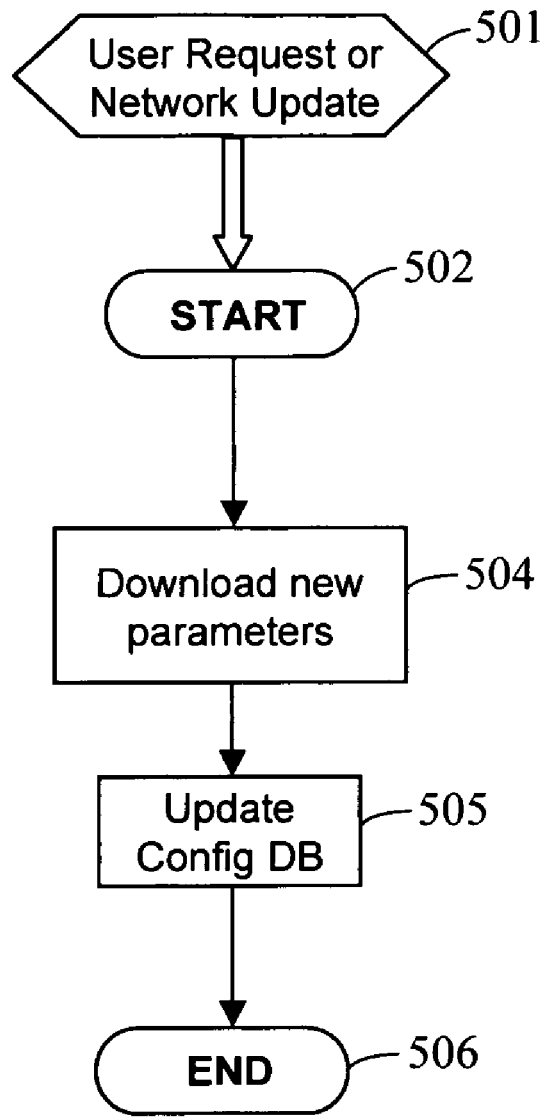
FIG. 5 is a flow chart of the capability update algorithm for the inventive device.

FIG. 5 shows the Capability Update algorithm for device 10. As discussed earlier, the inventive device is capable of requesting an update to support its communication with a new network. This update may be for the purpose of downloading an entirely new protocol, or for downloading an update to a known protocol. The update can occur as a result of a user request, or be initiated by a network (step 501). A network-based update is a network-initiated over-the-air download to the invention device 10. Typically, this update would occur when the inventive device first comes into contact with a new network operating with an unknown protocol. The update does not require user intervention and is used to provide periodic updates to the invention device. A user request can take the form of either an over-the-air request or a "physical" (i.e. service center or office) request in which the device is brought in for a stand-alone download. The algorithm starts at step 502. The device 10 has the capability to download updates to any of its configuration databases. The new parameters are downloaded at step 504. The Configuration Database 105 in device 10 are updated at step 505 with the new information. In this way, new technology support, or new functionality can be added to the inventive device's flexible architecture. The Capability Update algorithm ends at step 506.

FIG. 6 shows the detailed flow for the QAS algorithm 304 portion of the Position and Protocol Assisted Learning ($P^2AL$) algorithm. The algorithm 304 determines what contracted networks are available for access at this (new) location where device 10 is moved. The algorithm 304 is triggered at step 601 by either the initialization or power up of the device, or as the inventive device crosses the boundary of two networks. This latter event would occur, for example, when device 10 exits the coverage area and needs to find a new network with which to register. Data gathered from the GPS Sniffer/Scanner Receiver 103 is stored in the Geo (geographical) database 201. The algorithm starts at step 602. At step 605, the QAS algorithm determines available contracted networks by comparing the instantaneous location data to the boundary data stored in the Network Coverage Map database 203.

If a contracted network is present, as determined at step 606, a check is made at step 610 to see if there is more than one available contracted network. If no contracted network is present at step 606, the SAS Algorithm is run at step 607. If there is a match but with only one contracted network, the Network Profile information for that network is retrieved by the invention device 10 at step 611. At step 612, the appropriate CAI Protocol image is transferred to the Digital Radio Processor Platform 102 and thus sets the invention device 10's radio parameters to the appropriate Common Air Interface protocol. Along with the other network-specific parameters, the invention device functions with the necessary personality to interact with the contracted network. At step 613, the invention device 10 then attempts to communicate with the available contracted network. For example, if the geographic positioning of the invention device 10 places it within a network such as AT&T or Sprint, then that network's image is transferred to DRP 102 and the device 10 assumes the personality (technology and frequency) of a device contracted with that network. When the network responds, the communication is confirmed at step 614. If the contracted network is confirmed at step 615, at step 617, the invention device 10 transmits user-specific Access Personality data stored in the UPP 200B to identify itself to the network, and standard registration and authentication ensues at step 618. If the registration and authentication is successful (step 619), device 10 is ready for service at step 620 and the QAS algorithm ends at step 621.

If there is a match at step 610 based on NCM data 203 with more than one contracted network, which indicates that the device 10 is located within overlaid networks, then the device 10 creates a list of these contracted networks at step 625. It uses the Access Priority information 209 from the APT 200C at step 609 to determine which of the identified contracted networks should be accessed first. For example, if the geographical data places the invention device in both an AT&T and a Sprint network, then the Access Priority Table 200C, previously set by the user, is consulted to determine which network is preferred by the user. That is, the network with which the device 10 attempts to register. Once it has made that determination, the Network Profile information 205 stored in the UPP 200B for that network is retrieved by the device at step 611. The appropriate CAI Protocol image is transferred to the DRP 102 at step 612, setting the device's radio parameters to the appropriate Common Air Interface protocol. Along with the other network-specific parameters, device 10 functions with the necessary personality to interact with the network. The device 10 then repeats steps 613, 614, etc. as described above.

If the first registration and authentication process is not successful at step 619, and if, at step 622, there remain other contracted networks for which registration and authentication was not yet attempted, at step 624, the invention device 10 loops back to step 611 to load the specific parameter information of the next contracted network in the contracted network access priority list 209 and attempts the communication again. If the QAS algorithm 304 at step 619 exhausts the list of contracted networks and is unable to locate a contracted network at the position indicated by the GPS data, device 10 at step 623 invokes its Scan Access Selection algorithm 310 to dynamically scan for available contracted networks. Similarly, if there is no GPS data available or if the received GPS data does not appear to be within the stored coverage area maps of any of the contracted networks, the device 10 will also invoke its Scan Access Selection algorithm 310.

Figure 7:
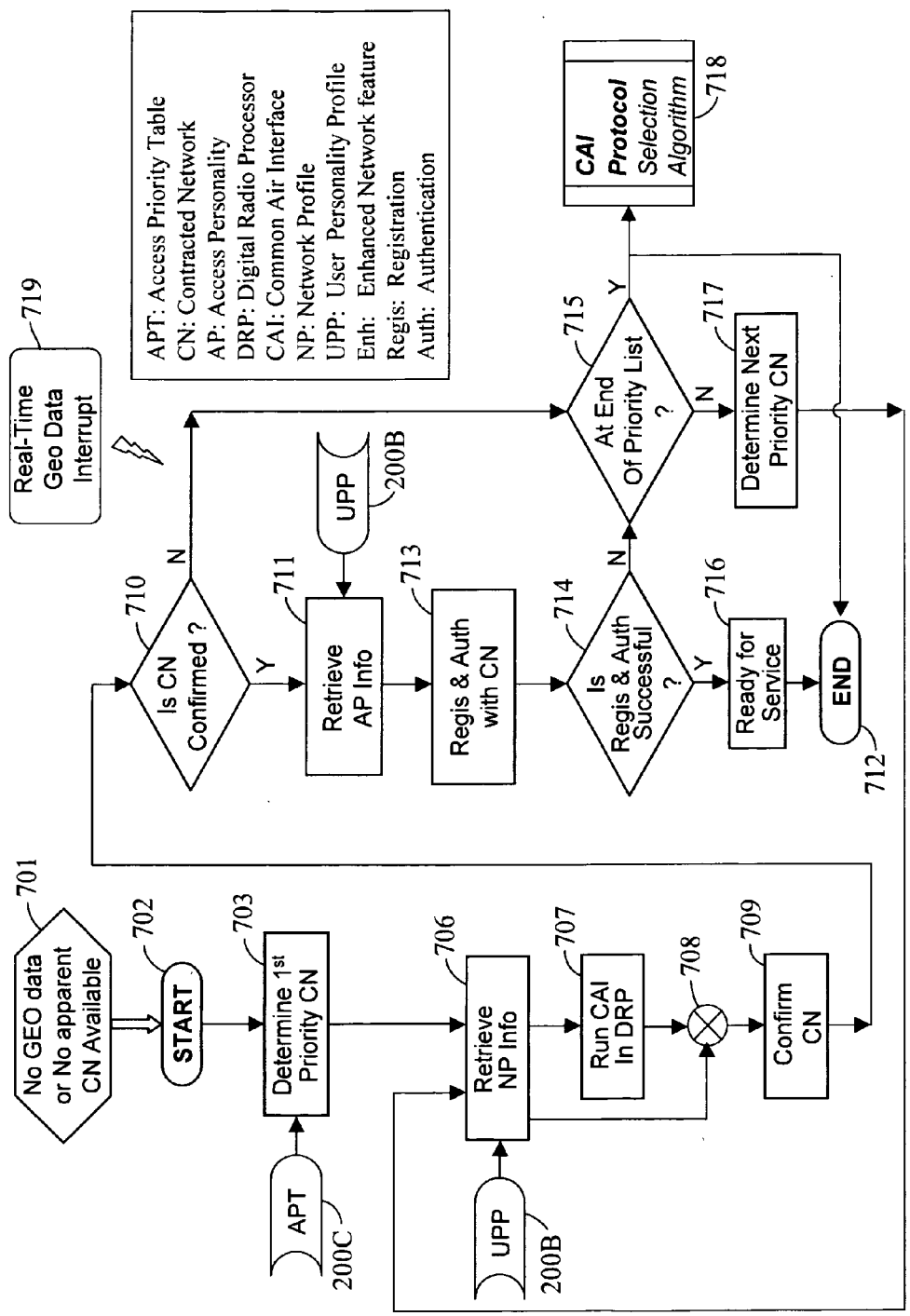
FIG. 7 is a flow chart of the scan access selection (SAS) algorithm portion of the $P^2AL$ algorithm.

FIG. 7 shows a detailed flow chart for the SAS algorithm portion of the Position and Protocol Assisted Learning ($P^2AL$) algorithm or, more particularly, of the Protocol Assisted Learning algorithm. The SAS algorithm is triggered if there is no available GPS data or if no available contracted network is identifiable by device 10. This may be because no contracted network is available according to the Network Coverage Map database 203 or no available contracted network is identified by the instantaneous geographical position data. If there is no GPS data available or the GPS data does not locate an available contracted network from the stored Network Coverage Map data (step 701) device 10 starts the SAS algorithm at step 702. The SAS algorithm uses the user-defined Access Priority Table 200C at step 703 to determine the first contracted network in the order of priority (predefined by the user) to be attempted for registration and authentication.

At step 706, the Network Profile 205 stored in the UPP 200B is retrieved for the contracted network. At step 707, the appropriate CAI Protocol image is transferred to the DRP platform 102, thus setting device 10's radio parameters to the appropriate Common Air Interface protocol. Along with the other network-specific parameters, device 10 adopts the necessary personality to interact with the selected contracted network at step 708. At step 709, device 10 then attempts to communicate on a control channel with the contracted network to try to confirm whether the selected contracted network is available. If the network responds with an acknowledgement that a contracted network has been found, at step 710, device 10 requests its SID information. Once received, the communication is confirmed. The invention device 10 then retrieves user-specific Access Personality data at step 711 and transmits the Access Personality data stored in the UPP 200B to identify itself to the located network. Standard registration and authentication process ensues at step 713. If the registration and authorization are successful in step 714, at step 716, device 10 is ready for service and the SAS Selection algorithm ends at step 712.

If the contracted network is not confirmed at step 710, the algorithm records the contracted network in an attempt log, and, if the list includes another contracted network at step 715, an iterative loop is processed at step 717 to attempt communication with the next contracted network in priority from the APT by returning to step 706. The iterative loop continues until a communication can be established or until device 10 has reached the end of its user-defined contracted network Access Priority list. If device 10 is able to communicate on the network's control channel, it then attempts to register and authenticate with the network at step 713. If the invention device fails to be authorized (i.e. the network did not acknowledge its communication), then it knows it is being rejected (although it is the correct common air interface protocol and the correct contracted network) and the SAS algorithm ends at step 712.

If the APT is exhausted without finding a contracted network with which to communicate, this SAS algorithm concludes, at step 718, by running the CAI Protocol Selection algorithm 311 of the $P^2AL$ Algorithm.

When searching by CAI protocol in CAI Protocol Selection algorithm 311, device 10 employs a control Digital Radio Processing section 102 in which a control channel access algorithm is stored for each contracted CAI protocol to allow device 10 to read any control channel. When starting the search, device 10 assumes the CAI protocol of the technology listed first in the CAI Protocol Access Priority Table 211 (for example, cdma2000). Device 10 transmits through the control channel and attempts to communicate with any available network. The invention device looks for a network acknowledgment and the network's SID (System Identification) information. If the communication is confirmed, the device requests a service transaction and informs the user. If not, it assumes the personality of the next highest CAI Protocol (for example, IS-136) and repeats the process of attempting to locate an available network. When an available network is located, that network's image is transferred to one of the DRPs. The device functions with that personality. Upon acknowledgement from the network, the device transmits user-specific Access Personality (AP) data to identify itself to the network, and standard registration and authentication ensues. The combination of the control channel and the SIDs are used within the $P^2AL$ algorithm to determine information about the device's location and environment.

Throughout this process, a real-time geographical data interrupt at step 719 is possible from the GPS receiver. This indicates that geographical positioning data has become available. Upon receiving the interrupt, the SAS algorithm is dynamically interrupted and device 10 runs its Quick Access Selection (QAS) algorithm.

Figure 8:
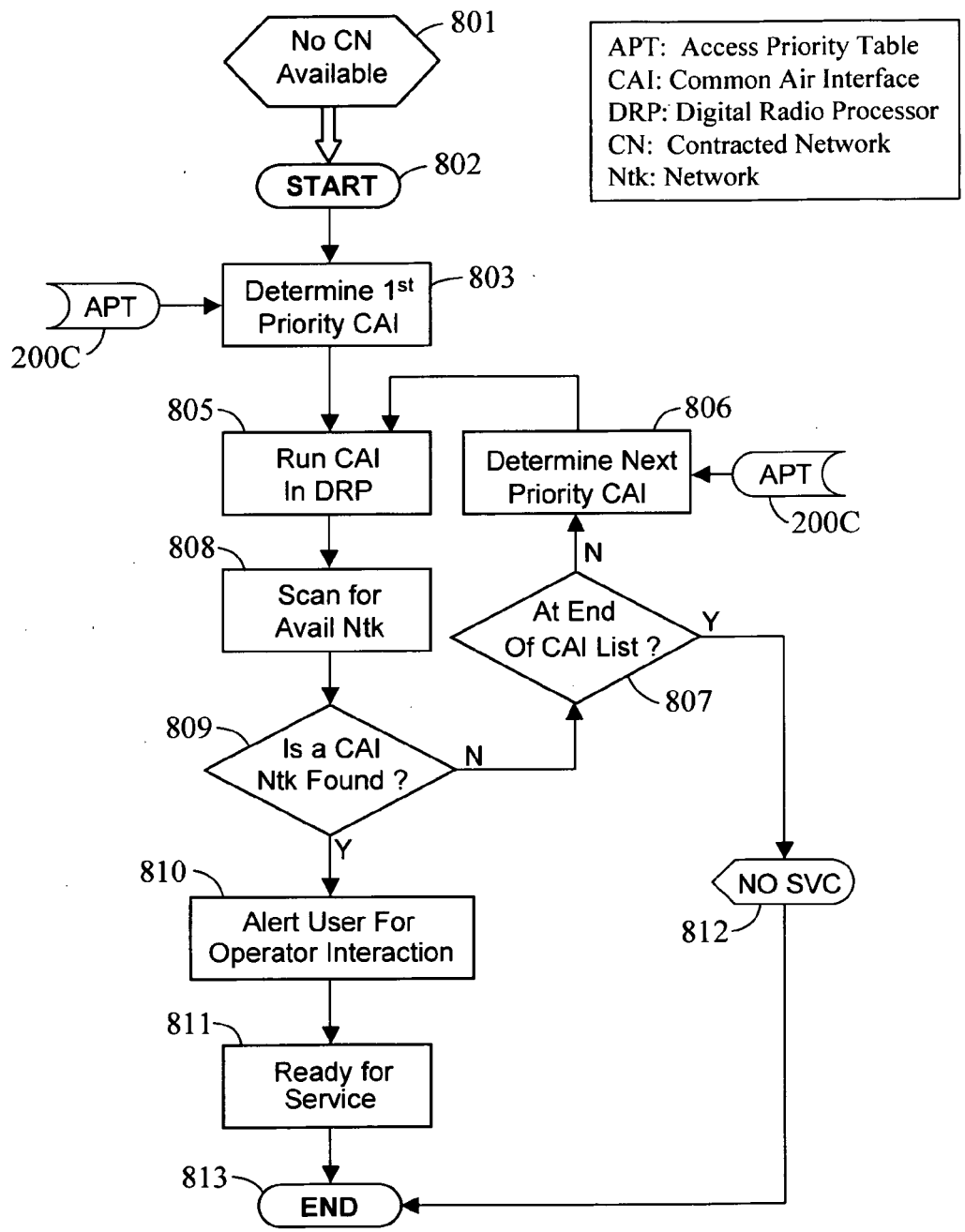
FIG. 8 is a flow chart of the common air interface (CAI) protocol selection algorithm portion of the $P^2AL$ algorithm.

FIG. 8 shows the detailed flow chart for the CAI Protocol Selection algorithm 311 portion of the Position and Protocol Assisted Learning ($P^2AL$) algorithm. If no contracted network is available at step 801, the CAI Protocol Selection algorithm starts at step 802. At step 803, device 10 retrieves the CAI Protocol Access Priority parameter data from the Access Priority Table 200C at step 804 and retrieves the first priority CAI Protocol. The appropriate CAI Protocol image is transferred to one of the DRPs at step 805, thus setting the device's radio parameters to run the appropriate Common Air Interface protocol (e.g., cdma2000). The device 10 then attempts, at step 808, to communicate on a control channel to any located network. If a network responds with an acknowledgement at step 809, the device requests its SID information. Once received, the communication is confirmed. Device 10 requests a service transaction and informs the user in step 810. If the communication is not confirmed, then it is not the correct control channel. If no network is found on a particular CAI, the algorithm checks at step 807 whether the list of CAIs has been exhausted. If not, the next priority CAI will be tried at step 806 and device 10 assumes the personality of the next highest CAI protocol stored in the APT 200C. If no network is found at step 807, a "No Service" message will be displayed at step 812. If a network is found, the user will be alerted at step 810 and the device will be ready for service at step 811. The CAI Protocol Selection algorithm ends at step 813.

The CAI Protocol Access priority table 200C is thus defined by order of air interface preference—for example, GSM followed by IS-136 then cdma2000. Each CAI protocol control channel is accessed in order of priority for an available network in which to activate service. Following the above example, the device 10 assumes a GSM personality and attempts to communicate on a control channel to any available network. If a network responds with an acknowledgement, device 10 requests the network's SID information and a service transaction and alerts the user for operator-assisted temporary registration with that network. If there is no response from any network through this CAI protocol, the next preferred CAI protocol is then used for network seeking. In the example, an IS-136 personality is then assumed and communication attempts are made on those control channels, etc. This iterative selection process continues until a network is found. If the CAI Protocol Access Priority Table is exhausted without finding an accessible wireless network, the invention device displays a result of "no service" in current wireless networks. However, in an enhanced network, the invention device facilitates real-time downloads of additional CAI protocol parameters to gain access to available networks. The Capability Update Algorithm in FIG. 5 is used for this with the APT 200C as the configuration database to be updated and the new parameters as new CAI protocol parameters.

Device 10 also introduces a mechanism for real-time transaction-based services. With real-time transaction-based services, the user can make a one-time arrangement with the network for temporary usage of services. A unique billing authentication code is stored permanently within the configuration database. The device 10 prompts the user for the special PIN and codeword combination to unlock its internal billing authentication code and user identity profile information. The billing authentication code is associated with a specific billing account by the customer. A special transaction identity profile is also stored within the User Personality Profile database, providing unique service configuration information for the invention device to the network. Both are activated by the special PIN and codeword sequence. Once entered by the user, the network gains access through the invention device to the unique authentication billing code number and user transaction profile. The invention device then functions like a calling card (credit card, or pre-paid card) which allows the network to bill that account number.

In this mode, the invention device does not require a "Home Network" for its temporary service use. The invention selects the first CAI Protocol in the CAI Protocol Access Priority List and attempts communication on the control channel, and when acknowledged by the network initiates a transaction as a temporary user, using the invention device to facilitate the transaction. Service activation is then based on this transaction opportunity.

The $P^2AL$ algorithm is flexible and modular in construction. As a result, the flow can be manipulated to achieve increased efficiency, flexibility or capability in the invention device in a particular application. For example, a priority-driven access selection algorithm for the invention device combines the QAS and SAS selection algorithms into a single algorithm driven by the user-defined Access Priority Table.

FIG. 9 is a rendering of one version of a priority driven access selection algorithm. This algorithm starts at step 901. At step 902, the first priority contracted network is determined from the APT 200C. It then runs a Quick Access Selection loop in which it looks for geographical position data 201 (step 904) and, if available (step 906), compares it to the NCM 203 for the first priority contracted network to determine if the invention device is in the coverage area of the first priority contracted network (step 908). If the instantaneous geographical position data and the NCM indicate that the device 10 is not in the coverage area of the first priority contracted network (step 910), the device then immediately returns to the APT list (step 902) to identify the next priority contracted network to which to attempt access. If there is no geographical data or if the NCM data confirms the invention device is in the coverage area of the first priority contracted network (step 911), the Network Profile information stored in the UPP 200B for that network is retrieved by the device 10 (step 912). Next, at step 914, the appropriate CAI Protocol image is transferred to one of the DRPs, setting the invention device's radio parameters to the appropriate Common Air Interface protocol. Along with the other network-specific parameters, the invention device functions with the necessary personality to interact with the selected contracted network (step 925). The invention device then attempts to communicate on a control channel with the contracted network (step 915). If the network responds with an acknowledgement, the invention device requests its SID information. Once received, the communication is confirmed (step 916). In step 917, the device then transmits user-specific Access Personality data stored in the UPP 200B to identify itself to the network, and standard registration and authentication process ensues (step 918). If the registration and authentication is successful (step 919), device 10 is ready for service (step 922) and the algorithm ends (step 924).

If the contracted network is not available at step 911, the communication is not confirmed at step 916, or the registration and authentication process is not successful at step 919 (and the priority list of contracted networks is not exhausted—step 920), the next priority contracted network is determined (step 923). The invention device loops back to step 904 and loads the specific parameter information for the next contracted network in the priority list and attempts the communication again. If the device exhausts the contracted networks in its Access Priority Table without finding a match (step 920), it calls its CAI Protocol Selection algorithm (step 921) to dynamically scan by the CAI protocol for available networks.

While the flow chart of FIG. 9 shows that the device also checks geographical position information when looping back to load the next priority contracted network, that loop can be bypassed in favor of simply loading each contracted network in turn. In mobile situations, the former is more efficient. When stationary, the latter approach is more effective.

The $P^2AL$ algorithm is network independent. The device 10 is able to take advantage of its User Personality Profile database to authenticate to any network without requiring a home (anchor) network. After an appropriate image is transferred to one of the DRPs and communication is successfully completed with the network (via its acknowledgement), the User Personality Profile information is transmitted to the network and authentication is completed between the invention device and the service activating network alone. No Home Network is required. Temporary service activation is also completed this way.

The practical application of SDR in this invention device creates the capability of dynamically asserting the proper personality from multiple identities for accessing a particular network without user intervention. The invention device is agile and robust enough to be used to access wide-area wireless networks as well as in-building, campus and enterprise wireless networks. The device's application of SDR supports dynamic real-time CAI protocol technology adaptation. The invention therefore supports the access of ad hoc networks by downloading CAI protocol parameters directly into the invention device over the radio link.

GPS receiver technology is readily available for use in current wireless devices. The invention device uses GPS technology in a unique and innovative way to provide the capability to accurately "see" its environment and "map" its location with respect to the coverage areas the current network supports. The invention uses this GPS data as the basis for a position-based "quick-access" scheme to "find" and register with a preferred network quickly from multiple available networks.

The device uses location, network, user and CAI protocol and other configuration databases to capture or create information about itself and provide a means to configure the device to function within any network in which it can register. The invention creates a platform for holding primary registration information for multiple independent networks without having to emulate the complete network service provider databases.

While the invention device 10 can function in current wireless networks, its inherent design does not require a home or anchor network to activate service in a contracted or visiting network. The invention device's user profile configuration database creates a unique means for home network independent service activation by storing the invention device's user-specific network parameters for transmission to the current network where service is requested. The invention device functions independently of a home network by providing its user service profile, user identity (portable number) and if necessary, billing code, to the contracted network it is accessing.

Within current network architectures, the invention device redefines the method for "roaming" by using its multi-personality capability to create additional "home" environments in the invention device's frequently visited networks, with all the capabilities and features of a home network. The invention device creates a platform for real-time transaction-based service arrangements in less frequently visited networks. This real-time transaction processing uses a unique encrypted billing code accessible by a special PIN and codeword to make a one-time arrangement between the network and the invention device for temporary use of their services.

When the codeword is activated, the charging algorithm is a function of the physical location of where the device is in the network which is determined by the geographical position data. This capability of the invention device creates a platform for location-based billing which allows the network to charge relative to its position in the network. It provides an accurate description of how many resources are used for a particular transaction.

The invention device provides an innovative approach to Wireless Number Portability by storing an encrypted telephone number within its user identity profile database for transmission to any network where service activation is required. The user unlocks the number from the user identity profile database via a unique PIN and codeword so it can be extracted by the contracted network. The invention device also has the flexibility to have a permanent number assigned which travels with it from network to network. As the invention device registers in a network, it leaves a trail of its presence. When the land line system attempts to locate the invention device, it will find all of the networks in which it has previously registered. The land line system will then page each identified network sequentially to locate the invention device's current location. Prior art SIM cards facilitate moving access numbers from device (phone) to device by moving the SIM card, but that card must be changed if the user travels to a different service provider. In contrast, the invention crosses those boundaries providing access to any network with the same physical device to seamlessly without hardware changes. The invention device supports personal telephone number capability in enhanced networks by providing access to a unique number in the device for the network. The invention device can therefore be reached in any network.

As explained above, this invention device stores a user "personality" profile corresponding to each wireless network with which it has contracted. These "personality" profiles allow the device to access any of its contracted wireless networks as a home user in that network. The invention device is able to recognize these contracted networks by means of network identity profiles stored in a table and dynamically compared to the current network the invention device is located within. As such, the invention device recognizes a contracted network and sends a request to that network. Once the network recognizes the invention device, the invention device receives an acknowledgement that permits it to register. The invention device then sends the appropriate "personality" information to the contracted network. These tasks are all accomplished without administrative intervention of the user. With the ability to appear as a "home" user in many different contracted networks, the invention device changes the way a user can travel ("roam") through many different networks. The invention device breaks down the current necessity of "home" and "visiting" differentiation.

When crossing contracted network boundaries, the invention device performs a "user-defined" hand-off scheme by only handing off to another available contracted network according to the Access Priority Table (APT). This provides the user with flexibility to not just hand off to an available network which may have a higher usage charge rate, different grade of service or in which a transaction would be necessary, but to a preferred, lower cost, better coverage network of user's choice.

The invention device enhances the current approach to PRLs by creating a platform for system access through multiple networks regardless of technology. The invention device stores the control channel access methods for different common air interface protocols and applies the proper approach to the indicated network. The invention device's default or preset capability adds enhanced flexibility to accessing the Control Channel by searching according to CAI protocol groups instead of network groups. The technology priority table is defined by order of air interface, for example, GSM followed by IS-136 then cdma2000. Each CAI protocol control channel is accessed in order of priority for a contracted network in which to activate service. The invention takes on this CAI protocol identity and attempts to transmit on a control channel. If the network responds with an acknowledgement, the invention device receives the network's SID information and determines if it is on the invention device's user priority list. Because the invention device can assume different personalities/identities and CAI protocols instantaneously, it can access a control channel in any combination of technology and CAI protocol as required. Current devices are limited by disparate approaches for network access. In older wireless networks such as AMPS and GSM, there is separate traffic and control channel access, versus today's digital wireless networks such as IS-136 which integrate their channel access (traffic and control) to grow capacity. IEEE 802.11x systems have no control channel, and new 3G and 4G networks will likely present yet another approach. The invention operates within any type of network access scheme, now or in the future.

The invention device supports multiple applications in a single unit with no need of user intervention for environment detection and application switching. The invention device automatically detects its environment and presents the corresponding personality to communicate with the available network.

As further explained above, the invention introduces the idea of Position and Protocol Assisted Learning ($P^2AL$), in which the invention device uses its configuration data to gather information about its environment A menu-driven and user-created Priority Table defines the order in which contracted networks are accessed. With available position data and the network coverage maps it "learned" or "developed" and enhanced over time, the invention device is able to quickly access available contracted networks in the area based on that data. Without that data, the invention device performs a "scan" access based on stored Network Profile and priority information. The $P^2AL$ algorithm allows the invention device to "see" its environment, its relationship to that environment, and to more effectively navigate within that environment.

Due to the algorithmic modularity and flexibility of the invention device, the basic architecture of the invention's Position and Protocol Assisted Learning ($P^2AL$) algorithms is adjustable for efficiency and applications. The component blocks of the $P^2AL$ algorithms and flows of interactions are readily mixed, matched and adjusted for innumerable configurations to take advantage of efficiencies, or compensate for inefficiencies, in the invention device's various applications. Such adaptations and flexibility are not possible without the core capabilities which identify this invention device.

The invention device also has the ability to dynamically update its capabilities either via physical means or via download over the air. These updates are originated either by the invention device (user) or originated by the network. With the software defined radio technology and the ability to download new CAI protocols, the invention device provides the ability to access any ad hoc network at any time. This invention truly enables a user to have access to all the subscribed communications services in any location, be it a conference room, remote location, airport or other transition point, at any time. This greatly enhances the user's efficiency and productivity.

This invention device eliminates the need for having external technology or service constructs to simulate contiguous service such as SIM cards (or other personality cards).

In addition to supporting conventional subscription-based services and transaction-based services (e.g., pre-paid services, calling card services), the invention device also introduces a mechanism for real-time transaction-based services, where there is a one-time transaction fee for a higher level of service access. With real-time transaction-based services, the user can make a one-time arrangement with the network for temporary usage of services through a unique encrypted billing number stored within it.

The invention provides a platform for enhanced business services such as call waiting, call forwarding, conference calling, Centrex-like services, data, video, and multimedia services with true mobility within a wireless communications environment. The invention device also provides a platform for Virtual Private Network (VPN) support.

The invention device also provides a platform for incorporating advanced wireless network architecture and design. The learning techniques and location awareness of the invention device provides a means for further exploitation with an enhanced network architecture and service platform to create an advanced network capability.

The flexibility of this database structure and the algorithms themselves support a myriad of implementations using the fundamental structure to efficiently execute the invention device's functionality.

Current networks limit the user devices to either subscription-based services with permanent databases and account control or transaction-based services such as pre-paid services. This invention redefines the method for "roaming". Conventionally, subscription-based services benefit the user most in their home environment. Outside that home environment, the user accrues a higher rate of billing for limited access in a roaming environment. With multiple personality capability, the frequently visited environments become additional "home" environments to the user with all the "home" environment advantages. For less frequently visited environments, the invention device allows the user to enjoy services based on transaction-based service arrangements. The invention device also introduces a mechanism for real-time transaction-based services, where there is a one-time transaction fee for a higher level of service access. With real-time transaction-based services, the user can make a one-time arrangement with the network for temporary usage of services. The invention device uses a unique encrypted billing number stored within it. This billing authentication code requires the use of a special PIN (Personal Identification Number) and codeword combination by the user to unlock the billing code. This pre-set number is associated by the user with a billing number/account such as a credit card number, which allows the invention device to be used for transaction-based services. In this transaction processing, the PIN and codeword combination also unlocks the encrypted information in the user identity profile database transmitting the user specific network requirements to the service activation network, including the invention device's portable number (e.g. wireless personal number).

The invention device provides a mechanism for an enhanced network to provide flexibility and expanded capability. It also provides tiered levels of security for access to business line networks such as VPNs through the use of the invention devices' User Personality Profile (UPP) configuration database.

This invention defines the architecture and design of a device that greatly expands the capability of current wireless devices to support multiple networks with the ease and advantage of a "home" device appearance. The invention device is used as a "home" device to access multiple registered networks.

Thus, in summary, in visualizing the use of device 10, FIG. 1 layers several networks upon themselves to show the device's process within them as described above. Device 10 uses its GPS system data as well as its coverage maps and network profiles to create an accurate map of its location. The GPS information is gathered to create locational boundaries. Network information is the reference point for creating that boundary information. The invention device functions as a sensor to gather intelligence about the boundaries of the different networks it travels into. This sensing function allows the invention device to see the networks when they stack together and to create a map of the coverage. All of the network profile information that goes along with any GPS system data is collected and related.

While the invention device may exist geographically in multiple contracted networks, it will register in those networks according to its $P^2AL$ algorithm. Starting with its highest priority contracted network (which could be its Home Network in an enhanced network environment), it passes into another contracted network which it recognizes by the Network Coverage Map (or the SID) and after communication acknowledgement with the network, provides the associated User Personality Profile information to the wireless network for service activation. As it passes into a non-contracted network (WN), known to be non-contracted because none of the stored profiles matches it, the invention device uses transaction-based billing to function as a visitor, or in an enhanced network architecture, provides a platform for storing temporary Network Profile data and having its home network assign a temporary User Personality Profile (UPP) for the transaction. Passing once again into another contracted network, recognized by its Network Profile (or SID), after communication acknowledgement with the network, the invention device 10 provides the corresponding user profile data for service activation.

The invention device provides a modular, expandable, platform for sensing and navigating effectively through its environment with programmable access capabilities. The invention provides seamless network access across multiple networks in any CAI protocol without requiring a home network to anchor its identity. The invention device functions as a transaction device for alternative billing in networks with which it is not contracted. Finally, the invention provides a future-proofed platform for enhanced wireless network constructs enabling its use in next generation wireless communications networks.

While there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. It is the intention, therefore, to be limited only as indicated by the scope of the claims appended hereto.

The invention claimed is:

1. A wireless device automatically adaptable to work with any of a plurality of wireless networks implementing different wireless transmission technologies, wherein the wireless device is adaptable without altering hardware in the wireless device supporting said transmission technology, the wireless device comprising:

a transceiver for receiving position data that includes information indicating a current physical position of the wireless device;

a memory for storing configuration data including wireless device profile information, network profile information, and the position data, wherein the network profile information comprises information concerning at least one of a plurality of contracted networks a plurality of non-contracted networks, and a plurality of private and public networks, including physical boundaries of at least one of the contracted networks, the non-contracted networks, the private networks, and the public networks, and wherein said plurality of contracted networks are networks with which a contractual relationship has been pre-established for said device to use said networks, and wherein the wireless device profile information includes identification information for said wireless device; and a processor configured to (a) select a wireless network from the plurality of wireless networks to access based on a comparison of the physical boundaries of at least one of the contracted networks, the non-contracted networks, the private networks and the public networks, with the position data, wherein said processor is configured to (b) select a transmission technology from a plurality of available transmission technologies based on the selected wireless network, and said processor is configured to (c) cause the transceiver to be adapted for the selected transmission technology of the selected wireless network, and wherein the transceiver is configured to register the wireless device with the network using said wireless device profile information, and to communicate with the selected wireless network using the selected transmission technology.

2. The wireless device of claim 1, wherein the wireless networks are one of a wide area wireless network, an in-building wireless network, a campus wireless network, or an enterprise wireless network.

3. The wireless device of claim 1, wherein the transceiver comprises one of a GPS Sniffer, or a GPS Scanner to determine the position data.

4. The wireless device of claim 1, wherein the transceiver comprises a Broadband Radio for allowing the wireless device to receive a full available spectrum of transmissions.

5. The wireless device of claim 1, wherein the transceiver comprises Digital Radio Processing platforms for supporting a transmission in each transmission technology of the plurality of available transmission technologies.

6. The wireless device of claim 1, wherein the selected wireless network is a contracted network, and the wireless device is provided with Home Network Services.

7. The wireless device of claim 1, wherein the wireless network comprises a Virtual Private Network (VPN).

8. The wireless device of claim 1, wherein the position data comprises Global Positioning System (GPS) data.

9. The wireless device of claim 1, wherein a plurality of available contracted networks exist, and the processor is operable to select a preferred available contracted network from the plurality of available contracted networks.

10. The wireless device of claim 9, wherein said network profile information includes priority information for at least one of said contracted networks to enable the selection of a preferred available contracted network using the contracted network priority information.

11. The wireless device of claim 1, further comprising:

an input configured to receive enhancement information for use by the wireless device to enhance a capability of the wireless device.

12. The wireless device of claim 1, wherein the selected transmission technology comprises a technology selected from the group consisting of CDMA, TDMA, CSMA, OFDM, a protocol supporting High Speed Internet Access, a protocol supporting the transmission of Video data, a protocol supporting the transmission of audio data, and a protocol supporting the transmission of multimedia data.

13. The wireless device of claim 1, wherein the configuration data includes a user's network preference and wherein the processor is programmed to select a preferred network from a plurality of available networks based upon the user's network preference.

14. The wireless device of claim 1, wherein the configuration data includes a phone number, and wherein the wireless device registers the phone number with the network so that a requester on the network can contact the wireless device.

15. The wireless device of claim 1, wherein the wireless device is one of a mobile phone, a PDA, a home appliance, and a mobile computer.

16. The wireless device of claim 1, wherein the transceiver is configured by storing radio parameter information to create a plurality of Digital Radio Processing platforms to establish access to the plurality of wireless networks.

17. The wireless device of claim 16, wherein the transceiver is configured to create the plurality of Digital Radio Processing platforms to establish simultaneous access to the plurality of wireless networks.

18. A wireless device automatically adaptable to work with any of a plurality of wireless networks implementing different wireless transmission technologies, wherein the wireless device is adaptable without altering hardware in the wireless device supporting said transmission technology, the wireless device comprising:

a transceiver for receiving position data that includes information indicating a current physical position of the wireless device;

a memory for storing configuration data including wireless device profile information, network profile information, and the position data, wherein the network profile information comprises information concerning a plurality of networks, including physical boundaries of at least one of the networks, and wherein the wireless device profile information includes identification information for said wireless device;

a processor configured to determine that either no position information has been received, or that a comparison of received position information with said network profile information fails to yield a known network at a current position of said wireless device;

wherein the transceiver is configured to search for information on at least one available network at the current position of the wireless device using Common Air Interface (CAI) protocol parameters; and wherein said processor is configured to select a transmission technology from the plurality of available transmission technologies based on the at least one available network, and said processor is configured to adapt the transceiver for the selected transmission technology of the available network, wherein the transceiver is configured to register the wireless device with the network using said wireless device profile information, and communicates with the selected wireless network using the selected transmission technology.

19. The wireless device of claim 18, wherein said memory further comprises CAI Protocol priority information, wherein the CAI Protocol priority information specifies an order of CAI protocols to scan in the search for available network information.

20. The wireless device of claim 18, wherein the wireless device is capable of requesting an enhancement to support a communication with the available network.

21. The wireless device of claim 20, wherein the enhancement comprises information to support an updated version of a transmission technology currently known to the wireless device.

22. The wireless device of claim 20, wherein the enhancement comprises information to support a new transmission technology not currently known to the wireless device.

23. The wireless device of claim 18, wherein the processor is configured to add information on the available network to the network profile information.

24. The wireless device of claim 18, wherein the transceiver is configured to transmit transaction data to the available network for the purchase of a service from the available network.

25. The wireless device of claim 24 wherein the transaction occurs without human intervention.

26. The wireless device of claim 24, wherein the transaction data comprises encrypted payment information.

27. The wireless device of claim 18, wherein the plurality of networks comprises at least one of a plurality of contracted networks, a plurality of non-contracted networks, and a plurality of private and public networks.

28. The wireless device of claim 18, wherein the transceiver is configured by storing radio parameter information to create a plurality of Digital Radio Processing platforms to establish access to the plurality of wireless networks.

29. The wireless device of claim 28, wherein the transceiver is configured to create the plurality of Digital Radio Processing platforms to establish simultaneous access to the plurality of wireless networks.

* * * * *